US012755551B2

(12) United States Patent
Wilson et al.

(10) Patent No.: US 12,755,551 B2
(45) Date of Patent: Oct. 6, 2026

(54) SUPPLEMENTING VISION-BASED SYSTEM TRAINING WITH SIMULATED CONTENT

(71) Applicant: Tesla, Inc., Austin, TX (US)

(72) Inventors: Matthew Wilson, Austin, TX (US); Artem Brizitskiy, Austin, TX (US); Yazan Haddadin, Austin, TX (US); Charles Henden, Austin, TX (US)

(73) Assignee: Tesla, Inc., Austin, TX (US)

( * ) Notice: Subject to any disclaimer, the term of this patent is extended or adjusted under 35 U.S.C. 154(b) by 95 days.

(21) Appl. No.: 18/320,888

(22) Filed: May 19, 2023

(65) Prior Publication Data

US 2023/0377348 A1 Nov. 23, 2023

Related U.S. Application Data

(60) Provisional application No. 63/365,078, filed on May 20, 2022, provisional application No. 63/365,110, filed on May 20, 2022.

(51) Int. Cl.

*G06V 20/56* (2022.01)
*G06T 5/70* (2024.01)
*G06T 17/00* (2006.01)
*G06V 10/70* (2022.01)

(52) U.S. Cl.

CPC ................ *G06V 20/56* (2022.01); *G06T 5/70* (2024.01); *G06T 17/00* (2013.01); *G06V 10/70* (2022.01)

(58) Field of Classification Search

CPC ...... G06V 20/56; G06V 10/70; G06V 10/774; G06T 5/70; G06T 17/00; G06T 15/20
See application file for complete search history.

(56) References Cited

U.S. PATENT DOCUMENTS

| | | | |
|---|---|---|---|
| 6,882,755 | B2 | 4/2005 | Silverstein et al. |
| 7,209,031 | B2 | 4/2007 | Nakai et al. |
| 7,391,907 | B1 | 6/2008 | Venetianer et al. |

(Continued)

FOREIGN PATENT DOCUMENTS

| | | | |
|---|---|---|---|
| AU | 2019261735 | A1 | 5/2016 |
| AU | 2019201716 | A1 | 10/2020 |

(Continued)

OTHER PUBLICATIONS

International Search Report and Written Opinion on PCT Appl. No. PCT/US2022/040784 dated Dec. 7, 2022 (15 pages).

(Continued)

*Primary Examiner* — Fernando Alcon
(74) *Attorney, Agent, or Firm* — Foley & Lardner LLP

(57) ABSTRACT

Systems and methods for training machine learning algorithms utilized for autonomous driving. An example method includes creating driving environments based at least on vision based image data received from a vehicle; simulating driving a virtual vehicle by importing driving environment scenario; in response to completing the simulation, analyzing simulated results; determining optimized driving parameters associated with the driving environment scenario; and generating a set of machine learning algorithms training data based on the determined optimized driving parameters. The driving environment scenario is based at least on the created driving environment.

14 Claims, 9 Drawing Sheets

(56) References Cited

U.S. PATENT DOCUMENTS

| | | | |
|---|---|---|---|
| 7,747,070 | B2 | 6/2010 | Puri |
| 7,904,867 | B2 | 3/2011 | Burch et al. |
| 7,974,492 | B2 | 7/2011 | Nishijima |
| 8,165,380 | B2 | 4/2012 | Choi et al. |
| 8,369,633 | B2 | 2/2013 | Lu et al. |
| 8,406,515 | B2 | 3/2013 | Cheatle |
| 8,509,478 | B2 | 8/2013 | Haas et al. |
| 8,588,470 | B2 | 11/2013 | Rodriguez Serrano et al. |
| 8,744,174 | B2 | 6/2014 | Hamada et al. |
| 8,773,498 | B2 | 7/2014 | Lindbergh |
| 8,874,266 | B1 | 10/2014 | Francis et al. |
| 8,912,476 | B2 | 12/2014 | Fogg |
| 8,913,830 | B2 | 12/2014 | Sun et al. |
| 8,928,753 | B2 | 1/2015 | Han et al. |
| 8,972,095 | B2 | 3/2015 | Furuno |
| 8,976,269 | B2 | 3/2015 | Duong |
| 9,008,422 | B2 | 4/2015 | Eid et al. |
| 9,081,385 | B1 | 7/2015 | Ferguson et al. |
| 9,275,289 | B2 | 3/2016 | Li et al. |
| 9,586,455 | B2 | 3/2017 | Sugai et al. |
| 9,606,539 | B1 | 3/2017 | Kentley et al. |
| 9,632,502 | B1 | 4/2017 | Levinson et al. |
| 9,672,437 | B2 | 6/2017 | Mccarthy |
| 9,710,696 | B2 | 7/2017 | Wang et al. |
| 9,738,223 | B2 | 8/2017 | Zhang et al. |
| 9,754,154 | B2 | 9/2017 | Craig et al. |
| 9,767,369 | B2 | 9/2017 | Furman et al. |
| 9,965,865 | B1 | 5/2018 | Agrawal et al. |
| 10,031,526 | B1 * | 7/2018 | Li .......................... G01S 19/03 |
| 10,049,328 | B2 | 8/2018 | Jiang et al. |
| 10,133,273 | B2 | 11/2018 | Linke |
| 10,140,252 | B2 | 11/2018 | Fowers et al. |
| 10,140,544 | B1 | 11/2018 | Zhao et al. |
| 10,146,225 | B2 | 12/2018 | Ryan |
| 10,152,655 | B2 | 12/2018 | Krishnamurthy |
| 10,167,800 | B1 | 1/2019 | Chung et al. |
| 10,169,680 | B1 | 1/2019 | Sachdeva et al. |
| 10,192,016 | B2 | 1/2019 | Ng et al. |
| 10,216,189 | B1 | 2/2019 | Haynes |
| 10,228,693 | B2 | 3/2019 | Micks |
| 10,242,293 | B2 | 3/2019 | Shim |
| 10,248,121 | B2 | 4/2019 | Vandenberg |
| 10,262,218 | B2 | 4/2019 | Lee et al. |
| 10,282,623 | B1 | 5/2019 | Ziyaee et al. |
| 10,296,828 | B2 | 5/2019 | Viswanathan |
| 10,303,961 | B1 | 5/2019 | Stoffel |
| 10,310,087 | B2 | 6/2019 | Laddha et al. |
| 10,311,312 | B2 | 6/2019 | Yu |
| 10,318,848 | B2 | 6/2019 | Dijkman et al. |
| 10,325,178 | B1 | 6/2019 | Tang |
| 10,331,974 | B2 | 6/2019 | Zia et al. |
| 10,338,600 | B2 | 7/2019 | Yoon et al. |
| 10,343,607 | B2 | 7/2019 | Kumon |
| 10,359,783 | B2 | 7/2019 | Williams et al. |
| 10,366,290 | B2 | 7/2019 | Wang |
| 10,372,130 | B1 | 8/2019 | Kaushansky et al. |
| 10,373,019 | B2 | 8/2019 | Nariyambut Murali et al. |
| 10,373,026 | B1 | 8/2019 | Kim |
| 10,380,741 | B2 | 8/2019 | Yedla et al. |
| 10,394,237 | B2 | 8/2019 | Xu et al. |
| 10,395,144 | B2 | 8/2019 | Zeng et al. |
| 10,402,646 | B2 | 9/2019 | Klaus |
| 10,402,986 | B2 | 9/2019 | Ray et al. |
| 10,414,395 | B1 | 9/2019 | Sapp |
| 10,423,934 | B1 | 9/2019 | Zanghi et al. |
| 10,436,615 | B2 | 10/2019 | Agarwal et al. |
| 10,452,905 | B2 | 10/2019 | Segalovitz |
| 10,460,053 | B2 | 10/2019 | Olson et al. |
| 10,467,459 | B2 | 11/2019 | Chen |
| 10,468,008 | B2 | 11/2019 | Beckman et al. |
| 10,468,062 | B1 | 11/2019 | Levinson |
| 10,470,510 | B1 | 11/2019 | Koh et al. |
| 10,474,160 | B2 | 11/2019 | Huang et al. |
| 10,474,161 | B2 | 11/2019 | Huang et al. |
| 10,474,928 | B2 | 11/2019 | N |
| 10,489,126 | B2 | 11/2019 | Kumar et al. |
| 10,489,972 | B2 | 11/2019 | Atsmon |
| 10,497,264 | B2 | 12/2019 | Rowell |
| 10,503,971 | B1 | 12/2019 | Dang et al. |
| 10,514,711 | B2 | 12/2019 | Bar-Nahum et al. |
| 10,528,824 | B2 | 1/2020 | Zou |
| 10,529,078 | B2 | 1/2020 | Abreu et al. |
| 10,529,088 | B2 | 1/2020 | Fine et al. |
| 10,534,854 | B2 | 1/2020 | Sharma et al. |
| 10,535,191 | B2 | 1/2020 | Sachdeva et al. |
| 10,542,930 | B1 | 1/2020 | Sanchez |
| 10,546,197 | B2 | 1/2020 | Shrestha et al. |
| 10,546,217 | B2 | 1/2020 | Albright et al. |
| 10,552,682 | B2 | 2/2020 | Jonsson et al. |
| 10,559,386 | B1 | 2/2020 | Neumann |
| 10,565,475 | B2 | 2/2020 | Lecue |
| 10,567,674 | B2 | 2/2020 | Kirsch |
| 10,568,570 | B1 | 2/2020 | Sherpa |
| 10,572,717 | B1 | 2/2020 | Zhu |
| 10,574,905 | B2 | 2/2020 | Srikanth et al. |
| 10,579,058 | B2 | 3/2020 | Oh |
| 10,579,063 | B2 | 3/2020 | Haynes et al. |
| 10,579,897 | B2 | 3/2020 | Redmon et al. |
| 10,586,280 | B2 | 3/2020 | Mckenna et al. |
| 10,591,914 | B2 | 3/2020 | Palanisamy et al. |
| 10,592,785 | B2 | 3/2020 | Zhu et al. |
| 10,599,701 | B2 | 3/2020 | Liu |
| 10,599,930 | B2 | 3/2020 | Lee et al. |
| 10,599,958 | B2 | 3/2020 | He et al. |
| 10,606,990 | B2 | 3/2020 | Tuli et al. |
| 10,609,434 | B2 | 3/2020 | Singhai |
| 10,614,344 | B2 | 4/2020 | Anthony et al. |
| 10,621,513 | B2 | 4/2020 | Deshpande |
| 10,627,818 | B2 | 4/2020 | Sapp et al. |
| 10,628,432 | B2 | 4/2020 | Guo |
| 10,628,686 | B2 | 4/2020 | Ogale et al. |
| 10,628,688 | B1 | 4/2020 | Kim et al. |
| 10,629,080 | B2 | 4/2020 | Kazemi |
| 10,636,161 | B2 | 4/2020 | Uchigaito |
| 10,636,169 | B2 | 4/2020 | Estrada et al. |
| 10,642,275 | B2 | 5/2020 | Silva et al. |
| 10,643,320 | B2 * | 5/2020 | Lee ......................... G06T 7/149 |
| 10,645,344 | B2 | 5/2020 | Marman et al. |
| 10,649,464 | B2 | 5/2020 | Gray |
| 10,650,071 | B2 | 5/2020 | Asgekar et al. |
| 10,652,565 | B1 | 5/2020 | Zhang |
| 10,656,657 | B2 | 5/2020 | Djuric |
| 10,657,391 | B2 | 5/2020 | Chen et al. |
| 10,657,418 | B2 | 5/2020 | Marder |
| 10,657,934 | B1 | 5/2020 | Kolen et al. |
| 10,661,902 | B1 | 5/2020 | Tavshikar |
| 10,664,750 | B2 | 5/2020 | Greene |
| 10,671,082 | B2 | 6/2020 | Huang et al. |
| 10,671,886 | B2 | 6/2020 | Price et al. |
| 10,678,244 | B2 | 6/2020 | Iandola et al. |
| 10,678,839 | B2 | 6/2020 | Gordon et al. |
| 10,678,997 | B2 | 6/2020 | Ahuja et al. |
| 10,679,129 | B2 | 6/2020 | Baker |
| 10,684,626 | B1 | 6/2020 | Martin |
| 10,685,159 | B2 | 6/2020 | Su |
| 10,685,188 | B1 | 6/2020 | Zhang et al. |
| 10,692,000 | B2 | 6/2020 | Surazhsky |
| 10,692,242 | B1 | 6/2020 | Morrison et al. |
| 10,693,740 | B2 | 6/2020 | Coccia |
| 10,698,868 | B2 | 6/2020 | Guggilla |
| 10,699,119 | B2 | 6/2020 | Lo et al. |
| 10,699,140 | B2 | 6/2020 | Kench et al. |
| 10,699,477 | B2 | 6/2020 | Levinson |
| 10,713,502 | B2 | 7/2020 | Tiziani |
| 10,719,759 | B2 | 7/2020 | Kutliroff |
| 10,725,475 | B2 | 7/2020 | Yang et al. |
| 10,726,264 | B2 | 7/2020 | Sawhney et al. |
| 10,726,279 | B1 | 7/2020 | Kim et al. |
| 10,726,374 | B1 | 7/2020 | Engineer |
| 10,732,261 | B1 | 8/2020 | Wang et al. |
| 10,733,262 | B2 | 8/2020 | Miller et al. |
| 10,733,482 | B1 | 8/2020 | Lee et al. |
| 10,733,506 | B1 | 8/2020 | Ogale et al. |
| 10,733,638 | B1 | 8/2020 | Jain et al. |

(56) References Cited

U.S. PATENT DOCUMENTS

| | | | |
|---|---|---|---|
| 10,733,755 B2 | 8/2020 | Liao et al. | |
| 10,733,876 B2 | 8/2020 | Moura | |
| 10,740,563 B2 | 8/2020 | Dugan | |
| 10,740,694 B2 * | 8/2020 | Harvill | G06N 5/04 |
| 10,740,914 B2 | 8/2020 | Xiao et al. | |
| 10,748,062 B2 | 8/2020 | Rippel et al. | |
| 10,748,247 B2 | 8/2020 | Paluri | |
| 10,751,879 B2 | 8/2020 | Li | |
| 10,755,112 B2 | 8/2020 | Mabuchi | |
| 10,755,575 B2 | 8/2020 | Johnston et al. | |
| 10,757,330 B2 | 8/2020 | Ashrafi | |
| 10,762,396 B2 | 9/2020 | Vallespi-Gonzalez et al. | |
| 10,768,628 B2 | 9/2020 | Martin et al. | |
| 10,768,629 B2 | 9/2020 | Song et al. | |
| 10,769,446 B2 | 9/2020 | Chang et al. | |
| 10,769,483 B2 | 9/2020 | Nirenberg et al. | |
| 10,769,493 B2 | 9/2020 | Yu et al. | |
| 10,769,494 B2 | 9/2020 | Xiao | |
| 10,769,525 B2 | 9/2020 | Redding et al. | |
| 10,776,626 B1 | 9/2020 | Lin et al. | |
| 10,776,673 B2 | 9/2020 | Kim | |
| 10,776,939 B2 | 9/2020 | Ma et al. | |
| 10,779,760 B2 | 9/2020 | Lee et al. | |
| 10,783,381 B2 | 9/2020 | Yu et al. | |
| 10,783,454 B2 | 9/2020 | Shoaib et al. | |
| 10,789,402 B1 | 9/2020 | Vemuri | |
| 10,789,544 B2 | 9/2020 | Fiedel et al. | |
| 10,790,919 B1 | 9/2020 | Kolen et al. | |
| 10,796,221 B2 | 10/2020 | Zhang et al. | |
| 10,796,355 B1 | 10/2020 | Price et al. | |
| 10,796,423 B2 | 10/2020 | Goja | |
| 10,798,368 B2 | 10/2020 | Briggs et al. | |
| 10,803,325 B2 | 10/2020 | Bai et al. | |
| 10,803,328 B1 | 10/2020 | Bai et al. | |
| 10,803,743 B2 | 10/2020 | Abari | |
| 10,805,629 B2 | 10/2020 | Liu et al. | |
| 10,809,730 B2 | 10/2020 | Chintakindi | |
| 10,810,445 B1 | 10/2020 | Kangaspunta | |
| 10,816,346 B2 | 10/2020 | Wheeler et al. | |
| 10,816,992 B2 | 10/2020 | Chen | |
| 10,817,731 B2 | 10/2020 | Vallespi-Gonzalez et al. | |
| 10,817,732 B2 | 10/2020 | Porter et al. | |
| 10,819,923 B1 | 10/2020 | Mccauley | |
| 10,824,122 B2 | 11/2020 | Mummadi et al. | |
| 10,824,862 B2 | 11/2020 | Qi et al. | |
| 10,828,790 B2 | 11/2020 | Nemallan | |
| 10,832,057 B2 | 11/2020 | Chan et al. | |
| 10,832,093 B1 | 11/2020 | Taralova | |
| 10,832,414 B2 | 11/2020 | Pfeiffer | |
| 10,832,418 B1 | 11/2020 | Karasev | |
| 10,833,785 B1 | 11/2020 | O'Shea et al. | |
| 10,836,379 B2 | 11/2020 | Xiao | |
| 10,838,936 B2 | 11/2020 | Cohen | |
| 10,839,230 B2 | 11/2020 | Charette et al. | |
| 10,839,578 B2 | 11/2020 | Coppersmith, III | |
| 10,843,628 B2 | 11/2020 | Kawamoto et al. | |
| 10,845,820 B2 | 11/2020 | Wheeler | |
| 10,845,943 B1 | 11/2020 | Ansari et al. | |
| 10,846,831 B2 | 11/2020 | Raduta | |
| 10,846,888 B2 | 11/2020 | Kaplanyan et al. | |
| 10,853,670 B2 | 12/2020 | Sholingar | |
| 10,853,739 B2 | 12/2020 | Truong et al. | |
| 10,860,919 B2 | 12/2020 | Kanazawa et al. | |
| 10,860,924 B2 | 12/2020 | Burger | |
| 10,867,444 B2 | 12/2020 | Russell et al. | |
| 10,871,444 B2 | 12/2020 | Al Shehri et al. | |
| 10,871,782 B2 | 12/2020 | Milstein et al. | |
| 10,872,204 B2 | 12/2020 | Zhu et al. | |
| 10,872,254 B2 | 12/2020 | Mangla et al. | |
| 10,872,326 B2 | 12/2020 | Garner | |
| 10,872,531 B2 | 12/2020 | Liu et al. | |
| 10,885,083 B2 | 1/2021 | Moeller-Bertram et al. | |
| 10,887,433 B2 | 1/2021 | Fu et al. | |
| 10,890,898 B2 | 1/2021 | Akella et al. | |
| 10,891,715 B2 | 1/2021 | Li | |
| 10,891,735 B2 | 1/2021 | Yang et al. | |
| 10,893,070 B2 | 1/2021 | Wang et al. | |
| 10,893,107 B1 | 1/2021 | Callari et al. | |
| 10,896,763 B2 | 1/2021 | Kempanna et al. | |
| 10,901,416 B2 | 1/2021 | Khanna et al. | |
| 10,901,508 B2 | 1/2021 | Laszlo et al. | |
| 10,902,551 B1 | 1/2021 | Mellado Bataller et al. | |
| 10,908,068 B2 | 2/2021 | Amer et al. | |
| 10,908,606 B2 | 2/2021 | Stein et al. | |
| 10,909,368 B2 | 2/2021 | Guo | |
| 10,909,453 B1 | 2/2021 | Myers et al. | |
| 10,915,783 B1 | 2/2021 | Hallman et al. | |
| 10,917,522 B2 | 2/2021 | Segalis et al. | |
| 10,921,817 B1 | 2/2021 | Kangaspunta | |
| 10,922,578 B2 | 2/2021 | Banerjee et al. | |
| 10,924,661 B2 | 2/2021 | Vasconcelos et al. | |
| 10,928,508 B2 | 2/2021 | Swaminathan | |
| 10,929,757 B2 | 2/2021 | Baker et al. | |
| 10,930,065 B2 | 2/2021 | Grant et al. | |
| 10,936,908 B1 | 3/2021 | Ho | |
| 10,937,186 B2 | 3/2021 | Wang et al. | |
| 10,943,101 B2 | 3/2021 | Agarwal et al. | |
| 10,943,132 B2 | 3/2021 | Wang et al. | |
| 10,943,355 B2 | 3/2021 | Fagg et al. | |
| 10,990,826 B1 | 4/2021 | Haider et al. | |
| 10,997,461 B2 | 5/2021 | Elluswamy et al. | |
| 11,126,180 B1 | 9/2021 | Kobilarov | |
| 11,157,287 B2 | 10/2021 | Talpes et al. | |
| 11,157,441 B2 | 10/2021 | Talpes et al. | |
| 11,256,958 B1 * | 2/2022 | Subbiah | G06F 18/2155 |
| 11,282,235 B2 | 3/2022 | Torikura et al. | |
| 11,292,462 B1 * | 4/2022 | Karasev | G05D 1/0221 |
| 11,295,180 B1 | 4/2022 | Tolstov et al. | |
| 11,409,692 B2 | 8/2022 | Das Sarma et al. | |
| 11,430,177 B1 * | 8/2022 | Lasram | G06T 15/06 |
| 11,447,142 B1 | 9/2022 | Engstrom et al. | |
| 11,501,572 B2 | 11/2022 | Naphade et al. | |
| 11,507,836 B1 | 11/2022 | Kurz et al. | |
| 11,615,223 B2 * | 3/2023 | Taralova | G06V 10/758<br>382/104 |
| 11,625,041 B2 * | 4/2023 | Das | G06V 10/25<br>701/23 |
| 11,921,824 B1 | 3/2024 | Hester et al. | |
| 2003/0035481 A1 | 2/2003 | Hahm | |
| 2005/0162445 A1 | 7/2005 | Sheasby et al. | |
| 2006/0072847 A1 | 4/2006 | Chor et al. | |
| 2006/0098843 A1 | 5/2006 | Chew | |
| 2006/0224533 A1 | 10/2006 | Thaler | |
| 2006/0280364 A1 | 12/2006 | Ma et al. | |
| 2009/0016571 A1 | 1/2009 | Tijerina | |
| 2010/0118157 A1 | 5/2010 | Ushijima et al. | |
| 2010/0121576 A1 | 5/2010 | Aso et al. | |
| 2012/0109915 A1 | 5/2012 | Kamekawa | |
| 2012/0110491 A1 | 5/2012 | Cheung | |
| 2012/0134595 A1 | 5/2012 | Fonseca et al. | |
| 2013/0173150 A1 | 7/2013 | Ghisio | |
| 2013/0342692 A1 | 12/2013 | Li et al. | |
| 2014/0003709 A1 | 1/2014 | Ranganathan et al. | |
| 2014/0093176 A1 | 4/2014 | Maeda et al. | |
| 2014/0270362 A1 | 9/2014 | Najafi Shoushtari et al. | |
| 2015/0104102 A1 | 4/2015 | Carreira | |
| 2016/0003636 A1 | 1/2016 | Ng-Thow-Hing et al. | |
| 2016/0132786 A1 | 5/2016 | Balan et al. | |
| 2016/0180197 A1 | 6/2016 | Kim et al. | |
| 2016/0307071 A1 | 10/2016 | Perronnin et al. | |
| 2016/0328856 A1 | 11/2016 | Mannino | |
| 2017/0011281 A1 | 1/2017 | Dijkman | |
| 2017/0060379 A1 * | 3/2017 | Capozella | G06F 3/04815 |
| 2017/0132334 A1 | 5/2017 | Levinson et al. | |
| 2017/0158134 A1 | 6/2017 | Shigemura | |
| 2017/0206434 A1 | 7/2017 | Nariyambut Murali et al. | |
| 2018/0012411 A1 | 1/2018 | Richey et al. | |
| 2018/0018590 A1 | 1/2018 | Szeto et al. | |
| 2018/0039853 A1 | 2/2018 | Liu | |
| 2018/0052225 A1 | 2/2018 | Bã-Hme et al. | |
| 2018/0067489 A1 | 3/2018 | Oder et al. | |
| 2018/0068459 A1 | 3/2018 | Zhang | |
| 2018/0068540 A1 | 3/2018 | Romanenko et al. | |
| 2018/0074506 A1 | 3/2018 | Branson | |

(56) References Cited

U.S. PATENT DOCUMENTS

2018/0121762 A1 5/2018 Han
2018/0150081 A1 5/2018 Gross et al.
2018/0188027 A1* 7/2018 Zhang ........................ G06T 7/11
2018/0189578 A1* 7/2018 Yang .................. G01C 21/3635
2018/0203456 A1 7/2018 Nagasaka et al.
2018/0211403 A1 7/2018 Hotson et al.
2018/0308012 A1 10/2018 Mummadi
2018/0314878 A1 11/2018 Lee et al.
2018/0348346 A1 12/2018 Vallespi-Gonzalez et al.
2018/0349782 A1 12/2018 Zheng et al.
2018/0357492 A1 12/2018 Allen et al.
2018/0357511 A1 12/2018 Misra
2018/0373943 A1 12/2018 Tanigawa et al.
2018/0374105 A1 12/2018 Azout et al.
2019/0005338 A1 1/2019 Watanabe
2019/0023277 A1 1/2019 Roger
2019/0025773 A1 1/2019 Yang et al.
2019/0026250 A1 1/2019 Das Sarma et al.
2019/0042894 A1 2/2019 Anderson
2019/0042919 A1 2/2019 Peysakhovich et al.
2019/0042944 A1 2/2019 Nair
2019/0042948 A1 2/2019 Lee et al.
2019/0049970 A1 2/2019 Djuric et al.
2019/0057314 A1 2/2019 Julian et al.
2019/0065637 A1 2/2019 Bogdoll et al.
2019/0072978 A1 3/2019 Dan et al.
2019/0079526 A1 3/2019 Vallespi-Gonzalez et al.
2019/0080602 A1 3/2019 Rice et al.
2019/0095780 A1 3/2019 Zhong et al.
2019/0095946 A1 3/2019 Azout et al.
2019/0096256 A1 3/2019 Rowell
2019/0101914 A1 4/2019 Coleman et al.
2019/0108417 A1 4/2019 Talagala et al.
2019/0122111 A1 4/2019 Min
2019/0130255 A1 5/2019 Yim
2019/0145765 A1 5/2019 Luo et al.
2019/0146497 A1 5/2019 Urtasun
2019/0146519 A1 5/2019 Miura et al.
2019/0147112 A1 5/2019 Gordon
2019/0147250 A1 5/2019 Zhang et al.
2019/0147254 A1 5/2019 Bai et al.
2019/0147255 A1 5/2019 Homayounfar et al.
2019/0147335 A1 5/2019 Wang et al.
2019/0147372 A1 5/2019 Luo et al.
2019/0156134 A1† 5/2019 Krishnan
2019/0156485 A1* 5/2019 Pfeiffer .................. G06N 20/00
2019/0158784 A1 5/2019 Ahn et al.
2019/0180154 A1 6/2019 Orlov et al.
2019/0185010 A1 6/2019 Ganguli et al.
2019/0189251 A1 6/2019 Horiuchi et al.
2019/0197357 A1 6/2019 Anderson et al.
2019/0204842 A1 7/2019 Jafari Tafti et al.
2019/0205402 A1 7/2019 Sernau et al.
2019/0205667 A1 7/2019 Avidan et al.
2019/0217791 A1 7/2019 Bradley et al.
2019/0227562 A1 7/2019 Mohammadiha et al.
2019/0228037 A1 7/2019 Nicol et al.
2019/0230282 A1 7/2019 Sypitkowski et al.
2019/0232955 A1 8/2019 Grimm et al.
2019/0235499 A1 8/2019 Kazemi et al.
2019/0236437 A1 8/2019 Shin et al.
2019/0243371 A1 8/2019 Nister et al.
2019/0244138 A1 8/2019 Bhowmick et al.
2019/0250622 A1 8/2019 Nister et al.
2019/0250626 A1 8/2019 Ghafarianzadeh et al.
2019/0250640 A1 8/2019 O'Flaherty et al.
2019/0251397 A1* 8/2019 Tremblay ............ G06F 18/2148
2019/0258878 A1 8/2019 Koivisto et al.
2019/0266418 A1 8/2019 Xu et al.
2019/0266610 A1 8/2019 Ghatage et al.
2019/0271559 A1* 9/2019 Colgate ................ G05D 1/0088
2019/0272446 A1 9/2019 Kangaspunta et al.
2019/0276041 A1 9/2019 Choi et al.
2019/0279004 A1 9/2019 Kwon
2019/0286652 A1 9/2019 Habbecke et al.
2019/0286972 A1 9/2019 El Husseini et al.
2019/0287028 A1 9/2019 St. Amant et al.
2019/0289281 A1 9/2019 Badrinarayanan et al.
2019/0294177 A1 9/2019 Kwon
2019/0294975 A1 9/2019 Sachs
2019/0303759 A1* 10/2019 Farabet ............. G06F 18/24133
2019/0310651 A1 10/2019 Vallespi-Gonzalez et al.
2019/0311290 A1 10/2019 Huang et al.
2019/0318099 A1 10/2019 Carvalho et al.
2019/0325088 A1 10/2019 Dubey et al.
2019/0325266 A1 10/2019 Klepper et al.
2019/0325269 A1 10/2019 Bagherinezhad et al.
2019/0325580 A1 10/2019 Lukac et al.
2019/0325595 A1 10/2019 Stein et al.
2019/0329790 A1 10/2019 Nandakumar
2019/0332875 A1 10/2019 Vallespi-Gonzalez et al.
2019/0333232 A1 10/2019 Vallespi-Gonzalez et al.
2019/0336063 A1 11/2019 Dascalu
2019/0339989 A1 11/2019 Liang et al.
2019/0340462 A1 11/2019 Pao et al.
2019/0340492 A1 11/2019 Burger et al.
2019/0340499 A1 11/2019 Burger et al.
2019/0347501 A1 11/2019 Kim et al.
2019/0349571 A1 11/2019 Herman et al.
2019/0354782 A1 11/2019 Kee et al.
2019/0354786 A1 11/2019 Lee et al.
2019/0354808 A1 11/2019 Park et al.
2019/0354817 A1 11/2019 Shlens et al.
2019/0354850 A1 11/2019 Watson et al.
2019/0370398 A1 12/2019 He et al.
2019/0370575 A1 12/2019 Nandakumar et al.
2019/0370935 A1 12/2019 Chang et al.
2019/0373322 A1 12/2019 Rojas-Echenique et al.
2019/0377345 A1 12/2019 Bachrach et al.
2019/0377965 A1 12/2019 Totolos, Jr. et al.
2019/0378049 A1 12/2019 Widmann et al.
2019/0378051 A1 12/2019 Widmann et al.
2019/0382007 A1 12/2019 Casas et al.
2019/0384303 A1 12/2019 Muller et al.
2019/0384304 A1 12/2019 Towal et al.
2019/0384309 A1 12/2019 Silva et al.
2019/0384994 A1 12/2019 Frossard et al.
2019/0385048 A1 12/2019 Cassidy et al.
2019/0385360 A1 12/2019 Yang et al.
2020/0004259 A1 1/2020 Gulino et al.
2020/0004351 A1 1/2020 Marchant et al.
2020/0012936 A1 1/2020 Lee et al.
2020/0017117 A1 1/2020 Milton
2020/0023836 A1 1/2020 Schneider et al.
2020/0025931 A1 1/2020 Liang et al.
2020/0026282 A1 1/2020 Choe et al.
2020/0026283 A1 1/2020 Barnes et al.
2020/0026992 A1 1/2020 Zhang et al.
2020/0027210 A1 1/2020 Haemel et al.
2020/0033858 A1 1/2020 Xiao et al.
2020/0033865 A1 1/2020 Mellinger, III
2020/0034665 A1 1/2020 Ghanta et al.
2020/0034710 A1 1/2020 Sidhu
2020/0036948 A1 1/2020 Song
2020/0039520 A1 2/2020 Misu
2020/0051550 A1 2/2020 Baker
2020/0057487 A1 2/2020 Sicconi et al.
2020/0060757 A1 2/2020 Ben-Haim
2020/0065711 A1 2/2020 Clément
2020/0065879 A1 2/2020 Hu
2020/0069973 A1 3/2020 Lou
2020/0073385 A1 3/2020 Jobanputra
2020/0074230 A1 3/2020 Englard
2020/0074266 A1* 3/2020 Peake .................. G06V 10/764
2020/0086880 A1 3/2020 Poeppel
2020/0089243 A1 3/2020 Poeppel
2020/0089246 A1 3/2020 Mcgill et al.
2020/0089969 A1 3/2020 Lakshmi Narayanan
2020/0090056 A1 3/2020 Singhal
2020/0097841 A1 3/2020 Ioannis et al.
2020/0098095 A1 3/2020 Borcs et al.
2020/0103894 A1 4/2020 Cella et al.
2020/0104705 A1 4/2020 Bhowmick et al.
2020/0104753 A1 4/2020 Demiralp et al.

(56) References Cited

U.S. PATENT DOCUMENTS

| | | | |
|---|---|---|---|
| 2020/0110416 | A1 | 4/2020 | Hong et al. |
| 2020/0117180 | A1 | 4/2020 | Cella |
| 2020/0117889 | A1 | 4/2020 | Laput |
| 2020/0117916 | A1 | 4/2020 | Liu |
| 2020/0117917 | A1 | 4/2020 | Yoo |
| 2020/0118035 | A1 | 4/2020 | Asawa |
| 2020/0118294 | A1 | 4/2020 | Nakao et al. |
| 2020/0125112 | A1 | 4/2020 | Mao et al. |
| 2020/0125844 | A1 | 4/2020 | She |
| 2020/0125845 | A1 | 4/2020 | Hess |
| 2020/0126129 | A1 | 4/2020 | Lkhamsuren |
| 2020/0126192 | A1* | 4/2020 | Munkberg ........... G06N 3/0464 |
| 2020/0134379 | A1 | 4/2020 | Gaidon et al. |
| 2020/0134427 | A1 | 4/2020 | Oh et al. |
| 2020/0134461 | A1 | 4/2020 | Chai et al. |
| 2020/0134466 | A1 | 4/2020 | Weintraub et al. |
| 2020/0134848 | A1 | 4/2020 | El-Khamy et al. |
| 2020/0143231 | A1 | 5/2020 | Fusi et al. |
| 2020/0143279 | A1 | 5/2020 | West et al. |
| 2020/0148201 | A1 | 5/2020 | King et al. |
| 2020/0149898 | A1 | 5/2020 | Felip Leon et al. |
| 2020/0151201 | A1 | 5/2020 | Chandrasekhar et al. |
| 2020/0151619 | A1 | 5/2020 | Mopur et al. |
| 2020/0151692 | A1 | 5/2020 | Gao et al. |
| 2020/0158822 | A1 | 5/2020 | Owens et al. |
| 2020/0158869 | A1 | 5/2020 | Amirloo Abolfathi et al. |
| 2020/0159225 | A1 | 5/2020 | Zeng et al. |
| 2020/0160064 | A1 | 5/2020 | Wang et al. |
| 2020/0160104 | A1 | 5/2020 | Urtasun et al. |
| 2020/0160117 | A1 | 5/2020 | Urtasun et al. |
| 2020/0160178 | A1 | 5/2020 | Kar et al. |
| 2020/0160532 | A1 | 5/2020 | Urtasun et al. |
| 2020/0160558 | A1 | 5/2020 | Urtasun et al. |
| 2020/0160559 | A1 | 5/2020 | Urtasun et al. |
| 2020/0160598 | A1 | 5/2020 | Manivasagam et al. |
| 2020/0162489 | A1 | 5/2020 | Bar-Nahum et al. |
| 2020/0167438 | A1 | 5/2020 | Herring |
| 2020/0167554 | A1 | 5/2020 | Wang et al. |
| 2020/0174481 | A1 | 6/2020 | Van Heukelom et al. |
| 2020/0175326 | A1 | 6/2020 | Shen et al. |
| 2020/0175354 | A1 | 6/2020 | Volodarskiy et al. |
| 2020/0175371 | A1 | 6/2020 | Kursun |
| 2020/0175401 | A1 | 6/2020 | Shen |
| 2020/0183482 | A1 | 6/2020 | Sebot et al. |
| 2020/0184250 | A1 | 6/2020 | Oko |
| 2020/0184333 | A1 | 6/2020 | Oh |
| 2020/0192389 | A1 | 6/2020 | Remine et al. |
| 2020/0193313 | A1 | 6/2020 | Ghanta et al. |
| 2020/0193328 | A1 | 6/2020 | Guestrin et al. |
| 2020/0202136 | A1 | 6/2020 | Shrestha et al. |
| 2020/0202196 | A1 | 6/2020 | Guo et al. |
| 2020/0209857 | A1 | 7/2020 | Djuric et al. |
| 2020/0209867 | A1 | 7/2020 | Valois et al. |
| 2020/0209874 | A1* | 7/2020 | Chen ..................... B60W 50/04 |
| 2020/0210717 | A1 | 7/2020 | Hou et al. |
| 2020/0210726 | A1* | 7/2020 | Yang ...................... G06V 10/25 |
| 2020/0210769 | A1 | 7/2020 | Hou et al. |
| 2020/0210777 | A1 | 7/2020 | Valois et al. |
| 2020/0216064 | A1 | 7/2020 | Du Toit et al. |
| 2020/0218722 | A1 | 7/2020 | Mai et al. |
| 2020/0218910 | A1 | 7/2020 | Herman |
| 2020/0218979 | A1* | 7/2020 | Kwon ...................... G06N 3/08 |
| 2020/0223434 | A1 | 7/2020 | Campos Macias et al. |
| 2020/0225758 | A1 | 7/2020 | Tang et al. |
| 2020/0226377 | A1 | 7/2020 | Campos Macias et al. |
| 2020/0226430 | A1 | 7/2020 | Ahuja et al. |
| 2020/0238998 | A1 | 7/2020 | Dasalukunte et al. |
| 2020/0242381 | A1 | 7/2020 | Chao et al. |
| 2020/0242408 | A1 | 7/2020 | Kim et al. |
| 2020/0242479 | A1* | 7/2020 | Kim ....................... G06V 20/41 |
| 2020/0242511 | A1 | 7/2020 | Kale et al. |
| 2020/0245654 | A1 | 8/2020 | Zhu et al. |
| 2020/0245869 | A1 | 8/2020 | Sivan et al. |
| 2020/0249685 | A1 | 8/2020 | Elluswamy et al. |
| 2020/0250456 | A1 | 8/2020 | Wang et al. |
| 2020/0250473 | A1 | 8/2020 | Elluswamy et al. |
| 2020/0250515 | A1 | 8/2020 | Rifkin et al. |
| 2020/0250874 | A1 | 8/2020 | Assouline et al. |
| 2020/0257301 | A1 | 8/2020 | Weiser |
| 2020/0257306 | A1 | 8/2020 | Nisenzon |
| 2020/0258057 | A1 | 8/2020 | Farahat et al. |
| 2020/0258380 | A1 | 8/2020 | Wissing et al. |
| 2020/0265247 | A1 | 8/2020 | Musk et al. |
| 2020/0272160 | A1 | 8/2020 | Djuric et al. |
| 2020/0272162 | A1 | 8/2020 | Hasselgren et al. |
| 2020/0272859 | A1 | 8/2020 | Iashyn et al. |
| 2020/0273231 | A1 | 8/2020 | Schied et al. |
| 2020/0279354 | A1 | 9/2020 | Klaiman |
| 2020/0279364 | A1 | 9/2020 | Sarkisian et al. |
| 2020/0279371 | A1 | 9/2020 | Wenzel et al. |
| 2020/0285464 | A1 | 9/2020 | Brebner |
| 2020/0286256 | A1 | 9/2020 | Houts et al. |
| 2020/0293786 | A1 | 9/2020 | Jia et al. |
| 2020/0293796 | A1 | 9/2020 | Sajjadi Mohammadabadi et al. |
| 2020/0293828 | A1 | 9/2020 | Wang et al. |
| 2020/0293905 | A1 | 9/2020 | Huang et al. |
| 2020/0294162 | A1 | 9/2020 | Shah |
| 2020/0294257 | A1 | 9/2020 | Yoo et al. |
| 2020/0294310 | A1 | 9/2020 | Lee et al. |
| 2020/0297237 | A1 | 9/2020 | Tamersoy et al. |
| 2020/0298891 | A1 | 9/2020 | Liang et al. |
| 2020/0301799 | A1 | 9/2020 | Manivasagam et al. |
| 2020/0302276 | A1 | 9/2020 | Yang et al. |
| 2020/0302291 | A1 | 9/2020 | Hong |
| 2020/0302627 | A1 | 9/2020 | Duggal et al. |
| 2020/0302662 | A1 | 9/2020 | Homayounfar et al. |
| 2020/0304441 | A1 | 9/2020 | Bradley et al. |
| 2020/0306640 | A1 | 10/2020 | Kolen et al. |
| 2020/0307562 | A1 | 10/2020 | Ghafarianzadeh et al. |
| 2020/0307563 | A1 | 10/2020 | Ghafarianzadeh et al. |
| 2020/0307578 | A1 | 10/2020 | Magolan et al. |
| 2020/0309536 | A1 | 10/2020 | Omari et al. |
| 2020/0309923 | A1 | 10/2020 | Bhaskaran et al. |
| 2020/0310442 | A1 | 10/2020 | Halder et al. |
| 2020/0311601 | A1 | 10/2020 | Robinson et al. |
| 2020/0312003 | A1 | 10/2020 | Borovikov |
| 2020/0315708 | A1 | 10/2020 | Mosnier |
| 2020/0320132 | A1 | 10/2020 | Neumann |
| 2020/0324073 | A1 | 10/2020 | Rajan Kesavelu Shekar et al. |
| 2020/0327192 | A1 | 10/2020 | Hackman et al. |
| 2020/0327443 | A1 | 10/2020 | Van Vredendaal et al. |
| 2020/0327449 | A1 | 10/2020 | Tiwari et al. |
| 2020/0327662 | A1 | 10/2020 | Liu et al. |
| 2020/0327667 | A1 | 10/2020 | Arbel |
| 2020/0331476 | A1 | 10/2020 | Chen et al. |
| 2020/0334416 | A1 | 10/2020 | Vianu et al. |
| 2020/0334495 | A1 | 10/2020 | Al-Rfou et al. |
| 2020/0334501 | A1 | 10/2020 | Lin et al. |
| 2020/0334551 | A1 | 10/2020 | Javidi |
| 2020/0334574 | A1 | 10/2020 | Ishida |
| 2020/0337648 | A1 | 10/2020 | Saripalli et al. |
| 2020/0339109 | A1* | 10/2020 | Hong ...................... G01S 13/86 |
| 2020/0341466 | A1 | 10/2020 | Pham et al. |
| 2020/0342350 | A1 | 10/2020 | Madar et al. |
| 2020/0342548 | A1 | 10/2020 | Mazed et al. |
| 2020/0342652 | A1 | 10/2020 | Rowell et al. |
| 2020/0348909 | A1 | 11/2020 | Das Sarma et al. |
| 2020/0350063 | A1 | 11/2020 | Thornton et al. |
| 2020/0351438 | A1 | 11/2020 | Dewhurst et al. |
| 2020/0356107 | A1 | 11/2020 | Wells |
| 2020/0356790 | A1 | 11/2020 | Jaipuria et al. |
| 2020/0356864 | A1 | 11/2020 | Neumann |
| 2020/0356905 | A1 | 11/2020 | Luk |
| 2020/0361083 | A1 | 11/2020 | Mousavian et al. |
| 2020/0361452 | A1 | 11/2020 | Mcgill et al. |
| 2020/0361485 | A1 | 11/2020 | Zhu et al. |
| 2020/0364481 | A1 | 11/2020 | Kornienko et al. |
| 2020/0364508 | A1 | 11/2020 | Gurel et al. |
| 2020/0364540 | A1 | 11/2020 | Elsayed et al. |
| 2020/0364746 | A1 | 11/2020 | Longano |
| 2020/0364953 | A1 | 11/2020 | Simoudis |
| 2020/0372362 | A1 | 11/2020 | Kim |
| 2020/0372402 | A1 | 11/2020 | Kursun et al. |
| 2020/0380362 | A1 | 12/2020 | Cao et al. |

(56) References Cited

U.S. PATENT DOCUMENTS

| | | | |
|---|---|---|---|
| 2020/0380383 | A1 | 12/2020 | Kwong et al. |
| 2020/0393841 | A1 | 12/2020 | Frisbie et al. |
| 2020/0394421 | A1 | 12/2020 | Yu et al. |
| 2020/0394457 | A1 | 12/2020 | Brady |
| 2020/0394495 | A1 | 12/2020 | Moudgill et al. |
| 2020/0394813 | A1 | 12/2020 | Theverapperuma et al. |
| 2020/0394911 | A1 | 12/2020 | Harmel et al. |
| 2020/0396394 | A1 | 12/2020 | Zlokolica et al. |
| 2020/0398855 | A1 | 12/2020 | Thompson |
| 2020/0401850 | A1 | 12/2020 | Bazarsky et al. |
| 2020/0401886 | A1 | 12/2020 | Deng et al. |
| 2020/0402155 | A1 | 12/2020 | Kurian et al. |
| 2020/0402226 | A1 | 12/2020 | Peng |
| 2020/0409364 | A1 | 12/2020 | Agrawal |
| 2020/0410012 | A1 | 12/2020 | Moon et al. |
| 2020/0410224 | A1 | 12/2020 | Goel |
| 2020/0410254 | A1 | 12/2020 | Pham et al. |
| 2020/0410288 | A1 | 12/2020 | Capota et al. |
| 2020/0410751 | A1 | 12/2020 | Omari et al. |
| 2021/0004014 | A1 | 1/2021 | Sivakumar |
| 2021/0004580 | A1 | 1/2021 | Sundararaman et al. |
| 2021/0004611 | A1 | 1/2021 | Garimella et al. |
| 2021/0004663 | A1 | 1/2021 | Park et al. |
| 2021/0006835 | A1 | 1/2021 | Slattery et al. |
| 2021/0011908 | A1 | 1/2021 | Hayes et al. |
| 2021/0012116 | A1 | 1/2021 | Urtasun et al. |
| 2021/0012210 | A1 | 1/2021 | Sikka et al. |
| 2021/0012230 | A1 | 1/2021 | Hayes et al. |
| 2021/0012239 | A1 | 1/2021 | Arzani et al. |
| 2021/0015240 | A1 | 1/2021 | Elfakhri et al. |
| 2021/0019215 | A1 | 1/2021 | Neeter |
| 2021/0026360 | A1 | 1/2021 | Luo |
| 2021/0027112 | A1 | 1/2021 | Brewington et al. |
| 2021/0027117 | A1 | 1/2021 | Mcgavran et al. |
| 2021/0030276 | A1 | 2/2021 | Li et al. |
| 2021/0031758 | A1 | 2/2021 | Urano et al. |
| 2021/0031759 | A1 | 2/2021 | Urano et al. |
| 2021/0034921 | A1 | 2/2021 | Pinkovich et al. |
| 2021/0035447 | A1 | 2/2021 | Urano et al. |
| 2021/0042575 | A1 | 2/2021 | Firner |
| 2021/0042928 | A1 | 2/2021 | Takeda et al. |
| 2021/0046954 | A1 | 2/2021 | Haynes |
| 2021/0049378 | A1 | 2/2021 | Gautam et al. |
| 2021/0049455 | A1 | 2/2021 | Kursun |
| 2021/0049456 | A1 | 2/2021 | Kursun |
| 2021/0049548 | A1 | 2/2021 | Grisz et al. |
| 2021/0049700 | A1 | 2/2021 | Nguyen et al. |
| 2021/0053570 | A1 | 2/2021 | Akella et al. |
| 2021/0056114 | A1 | 2/2021 | Price et al. |
| 2021/0056306 | A1 | 2/2021 | Hu et al. |
| 2021/0056317 | A1 | 2/2021 | Golov |
| 2021/0056420 | A1 | 2/2021 | Konishi et al. |
| 2021/0056701 | A1 | 2/2021 | Vranceanu et al. |
| 2021/0094558 | A1 | 4/2021 | Garcia et al. |
| 2021/0150244 | A1 | 5/2021 | Segal et al. |
| 2021/0163031 | A1 | 6/2021 | Jagbrant et al. |
| 2021/0201145 | A1 | 7/2021 | Pham et al. |
| 2021/0232824 | A1 | 7/2021 | Shayne et al. |
| 2021/0233390 | A1 | 7/2021 | Georgiou et al. |
| 2021/0263157 | A1 | 8/2021 | Zhu |
| 2021/0271259 | A1 | 9/2021 | Karpathy |
| 2021/0271898 | A1* | 9/2021 | Chen .................. G06F 16/7837 |
| 2021/0276574 | A1 | 9/2021 | Efrat Sela et al. |
| 2021/0302992 | A1 | 9/2021 | Chen et al. |
| 2021/0303922 | A1 | 9/2021 | Tu et al. |
| 2021/0342609 | A1 | 11/2021 | Smolyanskiy et al. |
| 2021/0347377 | A1 | 11/2021 | Siebert et al. |
| 2021/0347383 | A1 | 11/2021 | Siebert et al. |
| 2021/0358137 | A1 | 11/2021 | Lee et al. |
| 2021/0380099 | A1 | 12/2021 | Lee et al. |
| 2021/0406560 | A1 | 12/2021 | Park et al. |
| 2022/0044034 | A1 | 2/2022 | Roychowdhury et al. |
| 2022/0083785 | A1 | 3/2022 | Subramanian et al. |
| 2022/0092349 | A1 | 3/2022 | Yang |
| 2022/0105947 | A1 | 4/2022 | Postnikov et al. |
| 2022/0153263 | A1 | 5/2022 | Hotta et al. |
| 2022/0156525 | A1 | 5/2022 | Guizilini et al. |
| 2022/0185625 | A1 | 6/2022 | One |
| 2022/0227367 | A1 | 7/2022 | Kario et al. |
| 2022/0242441 | A1* | 8/2022 | Thompson .......... B60W 60/001 |
| 2022/0299656 | A1 | 9/2022 | Cui et al. |
| 2022/0383741 | A1 | 12/2022 | Sanchez |
| 2022/0402485 | A1 | 12/2022 | Kobilarov et al. |
| 2023/0053785 | A1 | 2/2023 | Carvalho et al. |
| 2023/0057509 | A1 | 2/2023 | Emmons et al. |
| 2023/0085938 | A1* | 3/2023 | He ......................... G06N 3/094 706/20 |
| 2023/0110027 | A1 | 4/2023 | Bajpayee et al. |
| 2023/0267720 | A1 | 8/2023 | Marvasti et al. |
| 2023/0326215 | A1 | 10/2023 | Yu et al. |
| 2024/0160194 | A1 | 5/2024 | Bakhshmand et al. |
| 2024/0317267 | A1 | 9/2024 | Bergquist et al. |
| 2024/0353231 | A1* | 10/2024 | Burlina .................. G06N 20/20 |
| 2024/0355132 | A1 | 10/2024 | Duan et al. |
| 2025/0162612 | A1 | 5/2025 | Woelki et al. |
| 2025/0171016 | A1 | 5/2025 | Garimella et al. |
| 2025/0242803 | A1 | 7/2025 | Brown et al. |

FOREIGN PATENT DOCUMENTS

| | | | |
|---|---|---|---|
| CN | 102737236 | A | 10/2012 |
| CN | 103236037 | B | 8/2013 |
| CN | 103366339 | A | 10/2013 |
| CN | 103500322 | B | 1/2014 |
| CN | 104835114 | A | 8/2015 |
| CN | 106419893 | A | 2/2017 |
| CN | 106504253 | A | 3/2017 |
| CN | 106558058 | B | 4/2017 |
| CN | 106598226 | B | 4/2017 |
| CN | 107031600 | A | 8/2017 |
| CN | 107133943 | B | 9/2017 |
| CN | 107169421 | A | 9/2017 |
| CN | 107169560 | B | 9/2017 |
| CN | 107507134 | A | 12/2017 |
| CN | 107885214 | A | 4/2018 |
| CN | 108111873 | B | 6/2018 |
| CN | 108122234 | A | 6/2018 |
| CN | 108229526 | B | 6/2018 |
| CN | 107368926 | B | 7/2018 |
| CN | 105318888 | B | 8/2018 |
| CN | 108491889 | A | 9/2018 |
| CN | 108549934 | B | 9/2018 |
| CN | 108647591 | A | 10/2018 |
| CN | 108710865 | A | 10/2018 |
| CN | 105550701 | B | 11/2018 |
| CN | 108764185 | A | 11/2018 |
| CN | 108845574 | A | 11/2018 |
| CN | 108898177 | A | 11/2018 |
| CN | 109086867 | A | 12/2018 |
| CN | 107103113 | B | 1/2019 |
| CN | 109215067 | A | 1/2019 |
| CN | 109359731 | A | 2/2019 |
| CN | 109389207 | A | 2/2019 |
| CN | 109389552 | A | 2/2019 |
| CN | 106779060 | B | 3/2019 |
| CN | 109579856 | A | 4/2019 |
| CN | 109615073 | A | 4/2019 |
| CN | 106156754 | B | 5/2019 |
| CN | 106650922 | B | 5/2019 |
| CN | 109791626 | A | 5/2019 |
| CN | 109901595 | A | 6/2019 |
| CN | 109902732 | A | 6/2019 |
| CN | 109934163 | A | 6/2019 |
| CN | 109948428 | A | 6/2019 |
| CN | 109949257 | A | 6/2019 |
| CN | 109951710 | A | 6/2019 |
| CN | 109975308 | A | 7/2019 |
| CN | 109978132 | A | 7/2019 |
| CN | 109978161 | A | 7/2019 |
| CN | 110060202 | A | 7/2019 |
| CN | 110069071 | A | 7/2019 |
| CN | 110084086 | A | 8/2019 |
| CN | 110096937 | A | 8/2019 |
| CN | 110111340 | A | 8/2019 |

(56) References Cited

FOREIGN PATENT DOCUMENTS

| | | | |
|---|---|---|---|
| CN | 110135485 | A | 8/2019 |
| CN | 110197270 | B | 9/2019 |
| CN | 110225341 | B | 9/2019 |
| CN | 110310264 | A | 10/2019 |
| CN | 110321965 | A | 10/2019 |
| CN | 110334801 | A | 10/2019 |
| CN | 110399875 | A | 11/2019 |
| CN | 110414362 | A | 11/2019 |
| CN | 110426051 | A | 11/2019 |
| CN | 110473173 | A | 11/2019 |
| CN | 110516665 | A | 11/2019 |
| CN | 110543837 | A | 12/2019 |
| CN | 110569899 | A | 12/2019 |
| CN | 110599537 | A | 12/2019 |
| CN | 110599864 | A | 12/2019 |
| CN | 110619282 | A | 12/2019 |
| CN | 110619283 | A | 12/2019 |
| CN | 110619330 | A | 12/2019 |
| CN | 110659628 | A | 1/2020 |
| CN | 110688992 | A | 1/2020 |
| CN | 107742311 | B | 2/2020 |
| CN | 110751280 | A | 2/2020 |
| CN | 110826566 | A | 2/2020 |
| CN | 110909587 | A1 | 3/2020 |
| CN | 107451659 | B | 4/2020 |
| CN | 110954111 | A | 4/2020 |
| CN | 110956185 | A | 4/2020 |
| CN | 110966991 | A | 4/2020 |
| CN | 111027549 | A | 4/2020 |
| CN | 111027575 | A | 4/2020 |
| CN | 111047225 | A | 4/2020 |
| CN | 111062973 | B | 4/2020 |
| CN | 111126453 | A | 5/2020 |
| CN | 111158355 | A | 5/2020 |
| CN | 107729998 | B | 6/2020 |
| CN | 111275080 | B | 6/2020 |
| CN | 111275129 | A | 6/2020 |
| CN | 111275618 | A | 6/2020 |
| CN | 111307162 | B | 6/2020 |
| CN | 111326023 | A | 6/2020 |
| CN | 111428943 | A | 7/2020 |
| CN | 111444821 | A | 7/2020 |
| CN | 111445420 | A | 7/2020 |
| CN | 111461052 | A | 7/2020 |
| CN | 111461053 | A | 7/2020 |
| CN | 111461110 | A | 7/2020 |
| CN | 111488770 | A | 8/2020 |
| CN | 111539514 | A | 8/2020 |
| CN | 111565318 | A | 8/2020 |
| CN | 111582216 | A | 8/2020 |
| CN | 111598095 | A | 8/2020 |
| CN | 111693972 | A | 9/2020 |
| CN | 107622258 | B | 10/2020 |
| CN | 111767801 | A | 10/2020 |
| CN | 111768002 | A | 10/2020 |
| CN | 111783545 | A | 10/2020 |
| CN | 111783971 | A | 10/2020 |
| CN | 111797657 | A | 10/2020 |
| CN | 111814623 | A | 10/2020 |
| CN | 111814902 | A | 10/2020 |
| CN | 111860499 | A | 10/2020 |
| CN | 111881856 | A | 11/2020 |
| CN | 111882579 | A | 11/2020 |
| CN | 111897639 | A | 11/2020 |
| CN | 111898507 | A | 11/2020 |
| CN | 111898523 | A | 11/2020 |
| CN | 111899227 | A | 11/2020 |
| CN | 112101175 | A | 12/2020 |
| CN | 112101562 | A | 12/2020 |
| CN | 112115953 | A | 12/2020 |
| CN | 112183739 | A | 1/2021 |
| CN | 112232497 | A | 1/2021 |
| CN | 112288658 | A | 1/2021 |
| CN | 112308095 | A1 | 2/2021 |
| CN | 112308799 | A | 2/2021 |
| CN | 112313663 | A | 2/2021 |
| CN | 112329552 | A | 2/2021 |
| CN | 112348783 | A | 2/2021 |
| CN | 111899245 | B | 3/2021 |
| DE | 20 2017 102 235 | U1 | 5/2017 |
| DE | 20 2017 102 238 | U1 | 5/2017 |
| DE | 10 2017 116 017 | A1 | 1/2019 |
| DE | 10 2018 130 821 | A1 | 6/2020 |
| DE | 10 2020 003 008 | A1 | 7/2020 |
| DE | 10 2019 008 316 | A1 | 8/2020 |
| DE | 10 2020 130 668 | A1 | 5/2021 |
| EP | 1 215 626 | B1 | 6/2002 |
| EP | 2 228 666 | B1 | 9/2010 |
| EP | 2 396 750 | B1 | 12/2011 |
| EP | 2 420 408 | B1 | 2/2012 |
| EP | 2 618 559 | B1 | 7/2013 |
| EP | 2 723 069 | A1 | 4/2014 |
| EP | 2 741 253 | A1 | 6/2014 |
| EP | 2 863 633 | B1 | 4/2015 |
| EP | 3 113 080 | B1 | 1/2017 |
| EP | 3 115 772 | A1 | 1/2017 |
| EP | 3 285 485 | A1 | 2/2018 |
| EP | 3 501 897 | B1 | 6/2019 |
| EP | 3 525 132 | A1 | 8/2019 |
| EP | 3 531 689 | A1 | 8/2019 |
| EP | 3 537 340 | A1 | 9/2019 |
| EP | 3 543 917 | A1 | 9/2019 |
| EP | 3 608 840 | A1 | 2/2020 |
| EP | 3 657 387 | A1 | 5/2020 |
| EP | 3 664 020 | A1 | 6/2020 |
| EP | 3 690 712 | A1 | 8/2020 |
| EP | 3 690 730 | A2 | 8/2020 |
| EP | 3 690 742 | A1 | 8/2020 |
| EP | 3 722 992 | A1 | 10/2020 |
| EP | 3 739 486 | A1 | 11/2020 |
| EP | 3 751 455 | A2 | 12/2020 |
| EP | 3 783 527 | A1 | 2/2021 |
| GB | 2 402 572 | B | 8/2005 |
| GB | 2 517 270 | B | 2/2015 |
| GB | 2 548 087 | A | 9/2017 |
| GB | 2 577 485 | A | 4/2020 |
| JP | 2578262 | Y2 | 8/1998 |
| JP | 3941252 | B2 | 7/2007 |
| JP | 4282583 | B2 | 6/2009 |
| JP | 4300098 | B2 | 7/2009 |
| JP | 2015-004922 | A | 1/2015 |
| JP | 5863536 | B2 | 2/2016 |
| JP | 6044134 | B2 | 12/2016 |
| JP | 2019-101535 | A | 6/2019 |
| JP | 6525707 | B2 | 6/2019 |
| JP | 2020-101927 | A | 7/2020 |
| JP | 2020-173744 | A | 10/2020 |
| KR | 100326702 | B1 | 3/2002 |
| KR | 101082878 | B1 | 11/2011 |
| KR | 101738422 | B1 | 5/2017 |
| KR | 101969864 | B1 | 4/2019 |
| KR | 101996167 | B1 | 7/2019 |
| KR | 102022388 | B1 | 9/2019 |
| KR | 102043143 | B1 | 11/2019 |
| KR | 102095335 | B1 | 3/2020 |
| KR | 102097120 | B1 | 4/2020 |
| KR | 10-2020-0085490 | A | 7/2020 |
| KR | 10-2020-0142266 | A | 12/2020 |
| KR | 102189262 | B1 | 12/2020 |
| TW | 200630819 | A | 9/2006 |
| TW | I294089 | B | 3/2008 |
| TW | I306207 | B | 2/2009 |
| WO | WO-02/052835 | A2 | 7/2002 |
| WO | WO-2016/032398 | A2 | 3/2016 |
| WO | WO-2016/048108 | A1 | 3/2016 |
| WO | WO-2016/207875 | A1 | 12/2016 |
| WO | WO-2017/158622 | A2 | 9/2017 |
| WO | WO-2019/005547 | A1 | 1/2019 |
| WO | WO-2019/067695 | A1 | 4/2019 |
| WO | WO-2019/089339 | A1 | 5/2019 |

(56) References Cited

FOREIGN PATENT DOCUMENTS

| | | |
|---|---|---|
| WO | WO-2019/092456 A1 | 5/2019 |
| WO | WO-2019/099622 A1 | 5/2019 |
| WO | WO-2019/122952 A1 | 6/2019 |
| WO | WO-2019/125191 A1 | 6/2019 |
| WO | WO-2019/126755 A1 | 6/2019 |
| WO | WO-2019/144575 A1 | 8/2019 |
| WO | WO-2019/182782 A1 | 9/2019 |
| WO | WO-2019/191578 A1 | 10/2019 |
| WO | WO-2019/216938 A1 | 11/2019 |
| WO | WO-2019/220436 A2 | 11/2019 |
| WO | WO-2020/006154 A2 | 1/2020 |
| WO | WO-2020/012756 A1 | 1/2020 |
| WO | WO-2020/025696 A1 | 2/2020 |
| WO | WO-2020/034663 A1 | 2/2020 |
| WO | WO-2020/056157 A1 | 3/2020 |
| WO | WO-2020/076356 A1 | 4/2020 |
| WO | WO-2020/097221 A1 | 5/2020 |
| WO | WO-2020/101246 A1 | 5/2020 |
| WO | WO-2020/120050 A1 | 6/2020 |
| WO | WO-2020/121973 A1 | 6/2020 |
| WO | WO-2020/131140 A1 | 6/2020 |
| WO | WO-2020/139181 A1 | 7/2020 |
| WO | WO-2020/139355 A1 | 7/2020 |
| WO | WO-2020/139357 A1 | 7/2020 |
| WO | WO-2020/142193 A1 | 7/2020 |
| WO | WO-2020/146445 A1 | 7/2020 |
| WO | WO-2020/151329 A1 | 7/2020 |
| WO | WO-2020/157761 A1 | 8/2020 |
| WO | WO-2020/163455 A1 | 8/2020 |
| WO | WO-2020/167667 A1 | 8/2020 |
| WO | WO-2020/174262 A1 | 9/2020 |
| WO | WO-2020/177583 A1 | 9/2020 |
| WO | WO-2020/185233 A1 | 9/2020 |
| WO | WO-2020/185234 A1 | 9/2020 |
| WO | WO-2020/195658 A1 | 10/2020 |
| WO | WO-2020/198189 A1 | 10/2020 |
| WO | WO-2020/198779 A1 | 10/2020 |
| WO | WO-2020/205597 A1 | 10/2020 |
| WO | WO-2020/221200 A1 | 11/2020 |
| WO | WO-2020/240284 A2 | 12/2020 |
| WO | WO-2020/245654 A1 | 12/2020 |
| WO | WO-2020/260020 A1 | 12/2020 |
| WO | WO-2020/264010 A1 | 12/2020 |

OTHER PUBLICATIONS

International Search Report and Written Opinion on PCT Appl. No. PCT/US2022/040793 dated Nov. 30, 2022 (17 pages).

International Search Report and Written Opinion on PCT Appl. No. PCT/US2022/040906 dated Nov. 18, 2022 (16 pages).

International Preliminary Report on Patentability on PCT/US2022/040784 Dtd Feb. 29, 2024 (10 pages).

International Preliminary Report on Patentability on PCT/US2022/040793 Dtd Feb. 29, 2024 (10 pages).

International Preliminary Report on Patentability on PCT/US2022/040906 Dtd Feb. 29, 2024 (9 pages).

ISR and WO on PCT patent application No. PCT/US2022/040793 dated Oct. 25, 2023 (30 pages).

Chen et al., "Simultaneous End-to-End Vehicle and License Plate Detection With Multi-Branch Attention Neural Network," 2020, IEEE Transactions on Intelligent Transportation Systems, vol. 21, Issue 9, 10 Pages.

Hu et al., "SINet: A Scale-Insensitive Convolutional Neural Network for Fast Vehicle Detection," 2019, IEEE Transactions on Intelligent Transportation Systems, vol. 20, Issue 3, 18 Pages.

Kumar et al., "OmniDet: Surround View Cameras Based Multi-Task Visual Perception Network for Autonomous Driving," 2021, IEEE, Robotics and Automation Letters, vol. 6, Issue 2 (8 Pages).

Li et al., "One-Stage Multi-Sensor Data Fusion Convolutional Neural Network for 3D Object Detection," 2019, 18 Pages.

Duzceker, et al., "DeepVideoMVS: Multi-View Stereo on Video with Recurrent Spatio-Temporal Fusion," arXiv:2012.02177, 16 pages (2021).

Adigun, "Ground Truth Data for Object Detection in Autonomous Vehicle from a Driving Simulator," Tallinn University of Technology Master's Thesis, 182486IVSM, 60 pages (2020).

Bojarski, et al., "End to End Learning for Self-Driving Cars," arXiv: 1604.07316, 9 pages (2016).

Gu, et al., "An LSTM-Based Autonomous Driving Model Using a Waymo Open Dataset," Applied Sciences 10(6):2046, 14 pages (2020).

Gudi, et al., "Real-Time Webcam Heart-Rate and Variability Estimation with Clean Ground Truth for Evaluation," Applied Scienecs 10(23):8630, 24 pages (2020).

Marion, et al., "LabelFusion: A Pipeline for Generating Ground Truth Labels for Real RGBD Data of Cluttered Scenes," arXiv: 1707.04796v3, 8 pages (2017).

* cited by examiner
† cited by third party

SUPPLEMENTING VISION-BASED SYSTEM TRAINING WITH SIMULATED CONTENT

CROSS-REFERENCE TO RELATED APPLICATION

This application claims priority to U.S. Provisional Patent Application No. 63/365,110 titled "SUPPLEMENTING VISION-BASED SYSTEM TRAINING WITH SIMULATED CONTENT" and filed on May 20, 2022, the disclosure of which is hereby incorporated herein by reference in its entirety. This application claims priority to U.S. Provisional Patent Application No. 63/365,078 titled "VISION-BASED MACHINE LEARNING MODEL FOR AUTONOMOUS DRIVING WITH ADJUSTABLE VIRTUAL CAMERA" and filed on May 20, 2022, the disclosure of which is hereby incorporated herein by reference in its entirety.

BACKGROUND

Technical Field

The present disclosure relates to machine learning models, and more particularly, to training of machine learning models using simulated content.

Description of Related Art

Generally described, computing devices and communication networks can be utilized to exchange data and/or information. In a common application, a computing device can request content from another computing device via the communication network. For example, a computing device can collect various data and utilize a software application to exchange content with a server computing device via the network (e.g., the Internet).

Generally described, a variety of vehicles, such as electric vehicles, combustion engine vehicles, hybrid vehicles, etc., can be configured with various sensors and components to facilitate the operation of the vehicle or management of one or more systems included in the vehicle. A vehicle may include sensor-based systems to facilitate in the operation of the vehicle. For example, vehicles may leverage location services or may access computing devices which provide location services. In another example, vehicles can also include navigation systems or access navigation components that can generate information related to navigational or directional information provided to vehicle occupants and users.

DETAILED DESCRIPTION

Introduction

Figure 1A:
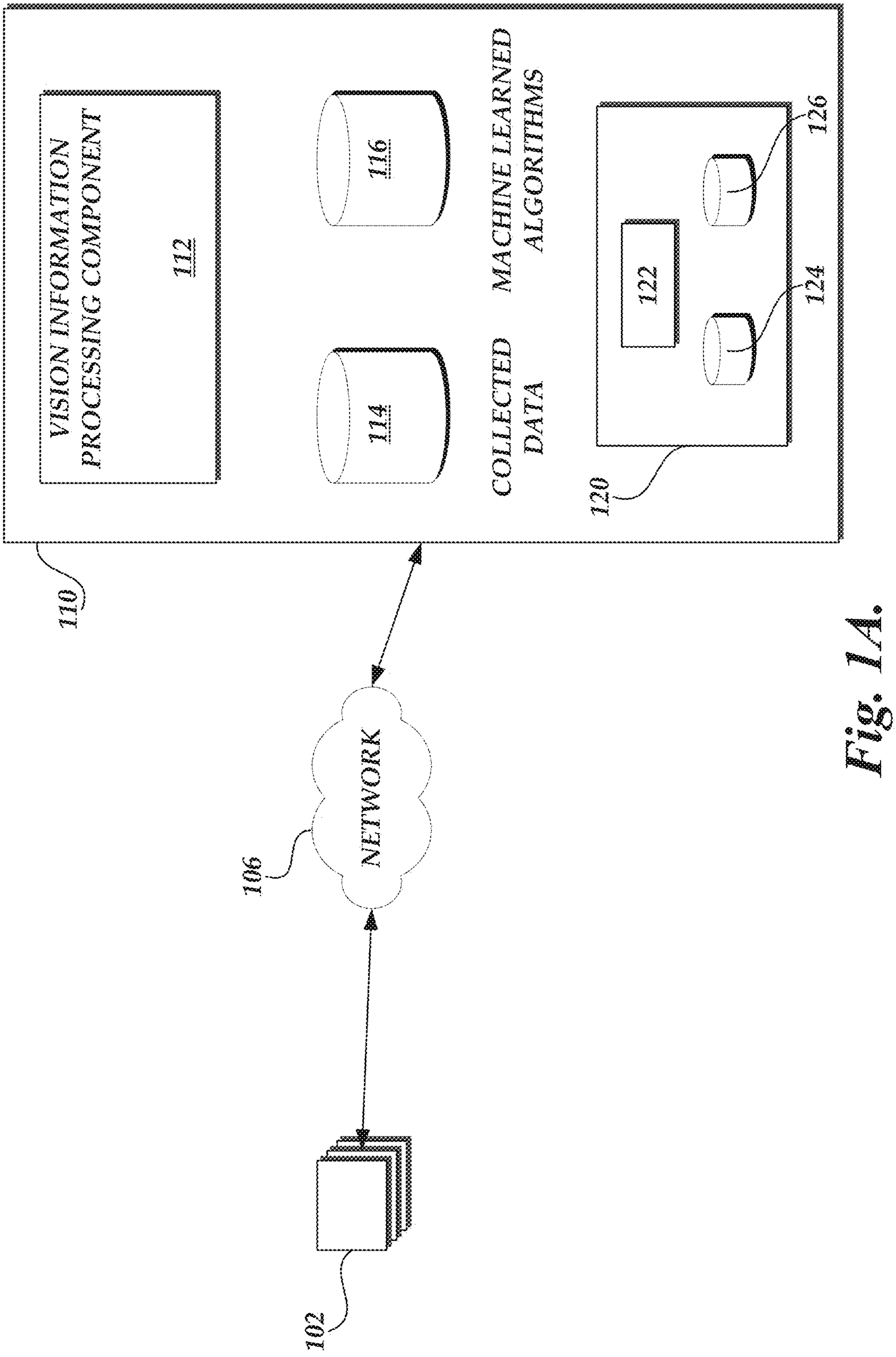
FIG. 1A is a diagram illustrating an example of an interactive environment of example embodiments.

Generally described, one or more aspects of the present disclosure relate to the configuration and implementation of vision systems in vehicles. By way of illustrative example, aspects of the present application relate to the configuration and training of machine learning algorithms used in vehicles relying solely on vision systems for various operational functions. Illustratively, the vision-only systems are in contrast to vehicles that may combine vision-based systems with one or more additional sensor systems, such as radar-based systems, LIDAR-based systems, SONAR-systems, and the like. As will be described, the vision systems may be trained using images, video clips, and so on which are obtained from a fleet of vehicles and also using simulated training data. For example, the simulated training data may be generated using a game engine (e.g., video game engine) which outputs realistic images, video clips, and so on. In this example, the simulated training data may have accurate ground truth labels since they are generated via the game engine. Thus, simulated training data may be used to supplement the fleet data to ensure that training data for corner cases may be reliably obtained.

Vision-only systems can be configured with vision-based machine learning models (e.g., herein also referred to as machine learning algorithms) that can process inputs solely from vision systems (e.g., a multitude of cameras) mounted on a vehicle. The machine learning algorithm can generate outputs identifying objects and specifying characteristics/attributes of the identified objects, such as position, velocity, and acceleration (e.g., measured relative to the vehicle). The outputs from the machine learning algorithms can be then utilized for further processing, such as for navigational systems, location systems, safety systems, and the like.

In contrast to other models which may leverage emissive sensors (e.g., radar, LIDAR), the vision-based machine learning model may rely upon increased software complexity to enable a reduction in sensor-based hardware complexity while enhancing accuracy. For example, only image sensors may be used in some embodiments. Through use of image sensors, such as cameras, the described model enables a sophisticated simulacrum of human vision-based driving. As will be described, the machine learning model may obtain images from the image sensors and combine (e.g., stitch or fuse) the information included therein. For example, the information may be combined into a vector space which is then further processed by the machine learning model to extract objects, signals associated with the objects, and so on.

In accordance with aspects of the present application, a network service can train the machine learning algorithm using labeled data, including identified objects and specified characteristics/attributes, such as position, velocity, acceleration, and the like. A first portion the training data set may correspond to data collected from target vehicles which include vision systems. Additionally, a second portion of the training data may correspond to additional information obtained from other systems, such as a simulation system which can generate video images and associated attribute information. The simulation system may execute a game engine to generate realistic training data.

Illustratively, a network service can receive the combined set of inputs (e.g., the first data set and the second data set). The network service can then combine the data based on a standardized data format. Illustratively, the combined data sets allow the supplementing of the previously collected vision data with additional information or attribute/characteristics that may not have been otherwise available from processing the vision data. The combined set of data can result in a set of data that tracks objects of a defined set of time based on the first and second sets of data. The network service can then process the combined data set using various techniques. Such techniques can include smoothing, extrapolation of missing information, applying kinetic models, applying confidence values, and the like. Thereafter, the network service generates an updated machine learning algorithm based on training on the combined data set.

This application also describes enhanced techniques for training the machine learning algorithms utilized for the autonomous or semi-autonomous driving (e.g., self-driving). In some aspects, the network service can simulate the autonomous driving of a virtual vehicle (e.g., vehicle used for the simulation) in various environments. These environments can include real driving environments and/or generated environments based on one or more driving scenarios or models. For example, a simulation system can be implemented in the network service, and the simulation system can obtain or create the environments and simulate the autonomous driving within these environments. In some aspects, the simulation system can provide simulated results, and the parameters and attributes of the machine learning algorithms can be updated based on the simulated results.

Traditionally, vehicles are associated with physical sensors that can be used to provide inputs to control components. For many navigational, location and safety system, the physical sensors include detection-based systems, such as radar systems, LIDAR systems, etc. that are able to detect objects and characterize attributes of the detected objects. In some applications, detection systems can increase the cost of manufacture and maintenance. Additionally, in some environmental scenarios, such as rain, fog, snow, the detection-based systems may not be well suited for detection or can increase detection errors.

To address at least a portion of the above deficiencies, aspects of the present application correspond to utilization of a combined set of inputs from sensors or sensing systems to generate machine learning algorithms for utilization in vehicles with vision system-only based processing. Aspects of the present application correspond to utilization of a combined set of inputs from sensors or sensing systems to create updated training sets for use in machine learning algorithms. The combined set of inputs includes a first set of data corresponding to vision system from a multitude of cameras configured in a vehicle. The combined set of inputs further includes a second set of data corresponding to simulation systems that generate additional training set data including visual images and data labels to supplemental the vision system data.

In some aspects of this application, a simulation system can be implemented in the network service. The simulation system can be utilized to verify, update, or modify one or more parameters of the machine learning algorithms utilized in autonomous driving. For example, the simulation system can generate various driving environments to verify the machine learning model. In this example, if the simulation results provide any indication to modify or update the parameters of the machine learning model, the model may be trained to update the parameters. For example, the simulation system can generate a certain driving environment which requires a vehicle to turn to a specific direction, with the environment including specific road conditions, other vehicles, traffic signals, pedestrians, and so on.

Advantageously, the simulation system may generate ground truth labels for objects, signals, and so on, which are the same as, or consistent with, a machine learning model executed by vehicles in production or end-user environments. Thus, the machine learning model may be trained using the simulation data the same as if the training was using human-labeled images or video clips. Specifically, the simulation system may leverage a game engine with modules or custom software which generates ground truth labels. As an example, a ground truth label may relate to a classification of a vehicle, particular signals or attributes associated with the vehicle (e.g., the passenger door is open, trunk is open), and so on. These ground truth labels may be generated based on the specific scene or environment which is being generated. For example, a script may be run which causes movement of a vehicle about a simulated area. In this example, the script may cause the vehicle to take particular actions (e.g., open a car door while driving) and ground truth labels may be generated accordingly.

The vehicle used for the simulation can generally be referred to as a virtual vehicle (e.g., vehicle used for the simulation). The virtual vehicle has the same functionality (e.g., autonomous driving or semi-autonomous driving) with the vehicle, generally referring vehicles (e.g., real-word vehicles).

In some aspects of this application, the various environment can be generated by receiving images from vehicles in a fleet of vehicles. These environments can also be generated by utilizing vision information. Illustratively, machine learning models can process the vision information and automatically generate these environments. In some embodiments, the environments can be generated based on real-world environment data.

In some embodiments the machine learning model may project objects positioned about a vehicle into a vector space associated with a birds-eye view. For example, the birds-eye view represents a view of a real-world environment about a vehicle in which a virtual camera is pointing downwards at a particular height. Thus, objects positioned about the vehicle are projected into this birds-eye view vector space effectuating the accurate identification of certain types of objects. Example description of the birds-eye view is included in U.S. patent application Ser. No. 17/820,849, titled "VISION-BASED MACHINE LEARNING MODEL FOR AGGREGATION OF STATIC OBJECTS AND SYSTEMS FOR AUTONOMOUS DRIVING," which is hereby incorporated by reference in its entirety and forms part of this disclosure as if set forth herein.

In some embodiments, the machine learning model may project objects positioned about a vehicle into a vector space associated with a periscope view. For example, the periscope view may represent a virtual camera being set at a first height (e.g., 1 meter, 1.5 meters, 2 meters, and so on) to detect certain objects (e.g., pedestrians). The periscope view may also represent the virtual camera being set at a second height (e.g., 13 meters, 15 meters, 20 meters) to detect other objects (e.g., vehicles). Example detailed description is included in U.S. Provisional Patent Application No. 63/365,078, which is now U.S. patent application Ser. No. 17/820,859, titled "VISION-BASED MACHINE LEARNING MODEL FOR AUTONOMOUS DRIVING WITH ADJUSTABLE VIRTUAL CAMERA," and which is hereby incorporated herein by reference in its entirety and forms part of this disclosure as if set forth herein. For example, the specific outputs described in the patent application may be used as ground truth labels as described herein.

In some embodiments, a lane connectivity network may be used to identify points and characterize the points as forming part of a lane. For example, the lane connectivity network may include a transformer network with one or more autoregressive blocks (e.g., GPT blocks). The lane connectivity network may autoregressively label points with associated characterizations, similar to that of describing the lanes in one or more sentences. For example, the lane connectivity network may describe a lane as including a multitude of points that may extend across an intersection. Additionally, the lane connectivity network may describe multiple lanes as including respective points which extend across an intersection. The lane connectivity network may characterize certain points as being, for example, merge points, forking points, and so on. The lane connectivity network may additionally characterize points as being in a lane which is characterized by an estimated width. The characterization of these points may allow for a spline, or other connection schemes, to be determined for the points in a lane.

In some embodiments, the simulation system further modifies the environments to include various conditions. For example, the simulation system can add various weather conditions, such that the raining or snowing weather condition can be added to the environments. In another example, other objects, such as vehicles, can be added. In another example, the road conditions, such as number of driving lanes or width of the lanes, can be added or modified. The present application does not limit the addition or modification of the environments.

Although the various aspects will be described in accordance with illustrative embodiments and a combination of features, one skilled in the relevant art will appreciate that the examples and combination of features are illustrative in nature and should not be construed as limiting. More specifically, aspects of the present application may be applicable with various types of vehicles, including vehicles with different of propulsion systems, such as combination engines, hybrid engines, electric engines, and the like. Still further, aspects of the present application may be applicable with various types of vehicles that can incorporate different types of sensors, sensing systems, navigation systems, or location systems. Accordingly, the illustrative examples should not be construed as limiting. Similarly, aspects of the present application may be combined with or implemented with other types of components that may facilitate operation of the vehicle, including autonomous driving applications, driver convenience applications and the like.

Interactive Example of Environments

FIG. 1A depicts a block diagram of an embodiment of the system 100. The system 100 can include a network, the network connecting a first set of vehicles 102, a network service 110, and a simulation system 120. Illustratively, the various aspects associated with the network service 110 and simulation system 120 can be implemented as one or more components that are associated with one or more functions or services. The components may correspond to software modules implemented or executed by one or more external computing devices, which may be separate stand-alone external computing devices. Accordingly, the components of the network service 110 and the simulation system 120 should be considered as a logical representation of the service, not requiring any specific implementation on one or more external computing devices. The simulation system 120 can be implemented as a discrete system or as a part of the network service 110. For purpose of illustration, FIG. 1A illustrates that the simulation system 120, as implemented in the network service 110.

Network 106, as depicted in FIG. 1A, connects the devices and modules of the system. The network can connect any number of devices. In some embodiments, a network service provider provides network-based services to client devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provide those services. In some embodiments, the network may be a content delivery network.

Illustratively, the set of vehicles 102 correspond to one or more vehicles configured with vision-only based system for identifying objects and characterizing one or more attributes of the identified objects. The set of vehicles 102 are configured with machine learning algorithms, such as machine learning algorithms which are configured to only utilize images to identify objects and characterize attributes of the identified objects (e.g., classification, position, velocity, and so on). The set of vehicles 102 may be configured without any additional detection systems, such as radar detection systems, LIDAR detection systems, and the like.

Illustratively, the network service 110 can include a multitude of network-based services that can provide functionality responsive to configurations/requests for machine learning algorithms for vision-only based systems as applied to aspects of the present application. As illustrated in FIG. 1A, the network-based services 110 can include a vision information processing component 112 that can obtain data sets from the vehicles 102 and the simulation systems 120 to process sets of data to form training data for machine learning algorithms 116 and generate trained machine learning algorithms 116 for vision-only based vehicles 102. The network-based service can include data stores for maintaining various information associated with aspects of the present application, including a vehicle data store 114 and machine learning algorithms 116. The data stores 114 and machine learning algorithms 116 in FIG. 1A are logical in nature and can be implemented in the network service 110 in a variety of manners.

The simulation system 120 can provide functionality related to providing visual frames of data and associated data labels for machine learning applications as applied to aspects of the present application. As illustrated in FIG. 1A, the simulation system 120 can include a scenario generation component 122 that can create various scenarios according to a set of defined attributes/variables. The simulation system 120 can include data stores for maintaining various information associated with aspects of the present application, including a scenario clip data store 124 and ground truth attribute data store 126. The data stores in FIG. 1A are logical in nature and can be implemented in the simulation system 120 in a variety of manners.

Figure 1B:
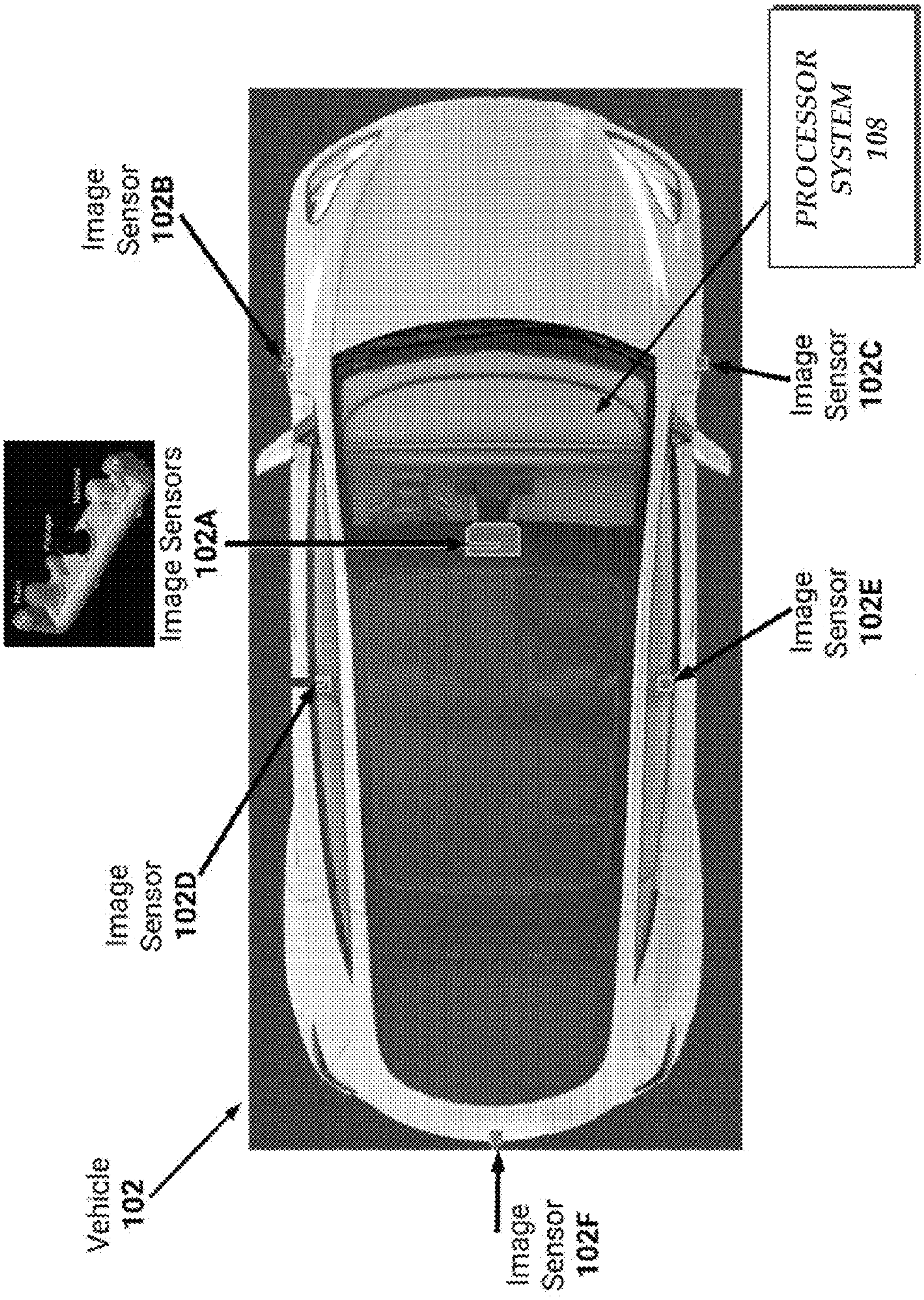
FIG. 1B is a block diagram illustrating an example autonomous or semi-autonomous vehicle which includes a multitude of image sensors an example processor system.

FIG. 1B is a block diagram illustrating an example autonomous vehicle 102 which includes a multitude of image sensors 102A-102F an example processor system 108. The image sensors 102A-102F may include cameras which are positioned about the vehicle 102. For example, the cameras may allow for a substantially 360-degree view around the vehicle 102.

The image sensors 102A-102F may obtain images which are used by the processor system 108 to, at least, determine information associated with objects positioned proximate to the vehicle 102. The images may be obtained at a particular frequency, such as 30 Hz, 36 Hz, 60 Hz, 65 Hz, and so on. In some embodiments, certain image sensors may obtain images more rapidly than other image sensors. As will be described below, these images may be processed by the processor system 108 based on the vision-based machine learning model described herein.

Image sensor A 102A may be positioned in a camera housing near the top of the windshield of the vehicle 102. For example, the image sensor A 102A may provide a forward view of a real-world environment in which the vehicle is driving. In the illustrated embodiment, image sensor A 102A includes three image sensors which are laterally offset from each other. For example, the camera housing may include three image sensors which point forward. In this example, a first of the image sensors may have a wide-angled (e.g., fish-eye) lens. A second of the image sensors may have a normal or standard lens (e.g., 35 mm equivalent focal length, 50 mm equivalent, and so on). A third of the image sensors may have a zoom or narrow-view lens. In this way, three images of varying focal lengths may be obtained in the forward direction by the vehicle 102.

Image sensor B 102B may be rear-facing and positioned on the left side of the vehicle 102. For example, image sensor B 102B may be placed on a portion of the fender of the vehicle 102. Similarly, Image sensor C 102C may be rear-facing and positioned on the right side of the vehicle 102. For example, image sensor C 102C may be placed on a portion of the fender of the vehicle 102.

Image sensor D 102D may be positioned on a door pillar of the vehicle 102 on the left side. This image sensor 102D may, in some embodiments, be angled such that it points downward and, at least in part, forward. In some embodiments, the image sensor 102D may be angled such that it points downward and, at least in part, rearward. Similarly, image sensor E 102E may be positioned on a door pillow of the vehicle 102 on the right side. As described above, image sensor E 102E may be angled such that it points downwards and either forward or rearward in part.

Image sensor F 102F may be positioned such that it points behind the vehicle 102 and obtains images in the rear direction of the vehicle 102 (e.g., assuming the vehicle 102 is moving forward). In some embodiments, image sensor F 102F may be placed above a license plate of the vehicle 102.

While the illustrated embodiments include image sensors 102A-102F, as may be appreciated additional, or fewer, image sensors may be used and fall within the techniques described herein.

The processor system 108 may obtain images from the image sensors 102A-102F and detect objects, and signals associated with the objects, using the vision-based machine learning model described herein. Based on the objects, the processor system 108 may adjust one or more driving characteristics or features. For example, the processor system 108 may cause the vehicle 102 to turn, slow down, brake, speed up, and so on. While not described herein, as may be appreciated the processor system 108 may execute one or more planning and/or navigation engines or models which use output from the vision-based machine learning model to effectuate autonomous driving.

In some embodiments, the processor system 108 may include one or more matrix processors which are configured to rapidly process information associated with machine learning models. The processor system 108 may be used, in some embodiments, to perform convolutions associated with forward passes through a convolutional neural network. For example, input data and weight data may be convolved. The processor system 108 may include a multitude of multiply-accumulate units which perform the convolutions. As an example, the matrix processor may use input and weight data which has been organized or formatted to facilitate larger convolution operations.

For example, input data may be in the form of a three-dimensional matrix or tensor (e.g., two-dimensional data across multiple input channels). In this example, the output data may be across multiple output channels. The processor system 108 may thus process larger input data by merging, or flattening, each two-dimensional output channel into a vector such that the entire, or a substantial portion thereof, channel may be processed by the processor system 108. As another example, data may be efficiently re-used such that weight data may be shared across convolutions. With respect to an output channel, the weight data may represent weight data (e.g., kernels) used to compute that output channel.

Figure 1C:
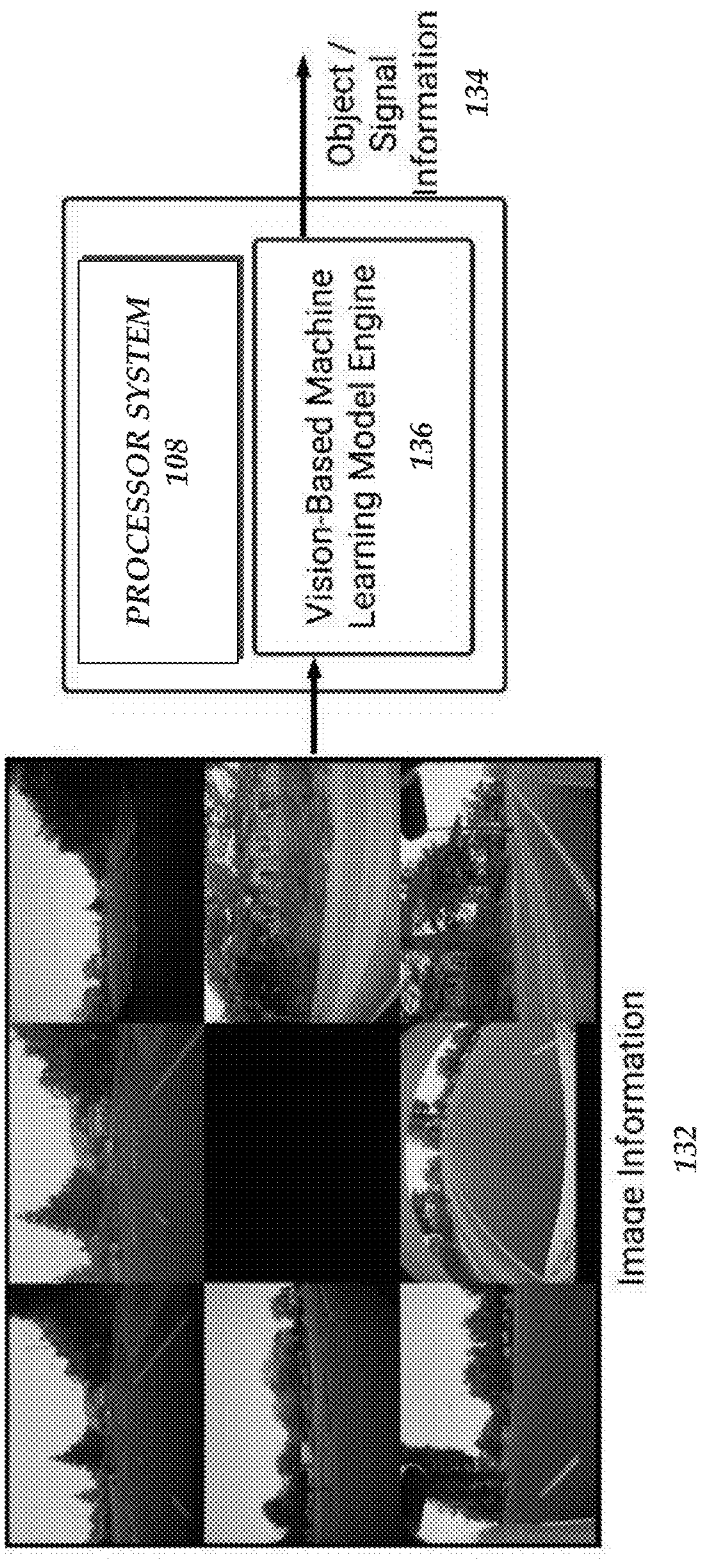
FIG. 1C is a block diagram illustrating the example processor system determining static information based on received image information from the example image sensors.

FIG. 1C is a block diagram illustrating the example processor system 108 determining object/signal information 134 based on received image information 132 from the example image sensors.

The image information 132 includes images from image sensors positioned about a vehicle (e.g., vehicle 102). In the illustrated example of FIG. 1B, there are 8 image sensors and thus 8 images are represented in FIG. 1C. For example, a top row of the image information 132 includes three images from the forward-facing image sensors. As described above, the image information 132 may be received at a particular frequency such that the illustrated images represent a particular time stamp of images. In some embodiments, the image information 132 may represent high dynamic range (HDR) images. For example, different exposures may be combined to form the HDR images. As another example, the images from the image sensors may be pre-processed to convert them into HDR images (e.g., using a machine learning model).

In some embodiments, each image sensor may obtain multiple exposures each with a different shutter speed or integration time. For example, the different integration times may be greater than a threshold time difference apart. In this example, there may be three integration times which are, in some embodiments, about an order of magnitude apart in time. The processor system 108, or a different processor, may select one of the exposures based on measures of clipping associated with images. In some embodiments, the processor system 108, or a different processor may form an image based on a combination of the multiple exposures. For example, each pixel of the formed image may be selected from one of the multiple exposures based on the pixel not including values (e.g., red, green, blue) values which are clipped (e.g., exceed a threshold pixel value).

The processor system 108 may execute a vision-based machine learning model engine 136 to process the image information 132. As described herein, the vision-based machine learning model may combine information included in the images. For example, each image may be provided to a particular backbone network. In some embodiments, the backbone networks may represent convolutional neural networks. Outputs of these backbone networks may then, in some embodiments, be combined (e.g., formed into a tensor) or may be provided as separate tensors to one or more further portions of the model. In some embodiments, an attention network (e.g., cross-attention) may receive the combination or may receive input tensors associated with each image sensor.

Various examples of vision-based machine learning model engine 136 to process the image information 132 are described in U.S. patent application Ser. No. 17/820,849, titled "VISION-BASED MACHINE LEARNING MODEL FOR AGGREGATION OF STATIC OBJECTS AND SYSTEMS FOR AUTONOMOUS DRIVING," and U.S. patent application Ser. No. 17/820,859, titled "VISION-BASED MACHINE LEARNING MODEL FOR AUTONOMOUS DRIVING WITH ADJUSTABLE VIRTUAL CAMERA," which are hereby incorporated by references in their entirety and form part of this disclosure as if set forth herein.

Example Embodiments of Vehicles

Figure 2:
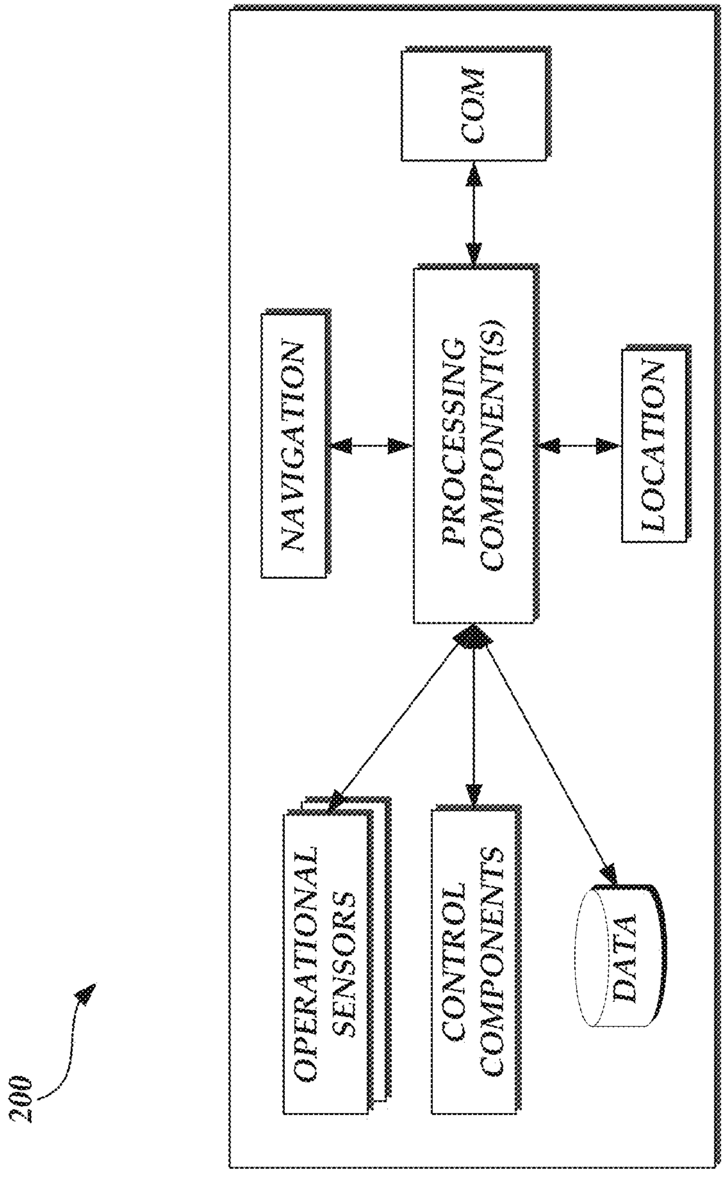
FIG. 2 is a diagram illustrating an example embodiment corresponding to a vehicle.

For purposes of illustration, FIG. 2 illustrates an environment 200 that corresponds to vehicles 102 in accordance with one or more aspects of the present application. The environment includes a collection of local sensor inputs that can provide inputs for the operation of the vehicle or collection of information as described herein. The collection of local sensors can include one or more sensor or sensor-based systems included with a vehicle or otherwise accessible by a vehicle during operation. The local sensors or sensor systems may be integrated into the vehicle. Alternatively, the local sensors or sensor systems may be provided by interfaces associated with a vehicle, such as physical connections, wireless connections, or a combination thereof.

In one aspect, the local sensors can include vision systems that provide inputs to the vehicle, such as detection of objects, attributes of detected objects (e.g., position, velocity, acceleration), presence of environment conditions (e.g., snow, rain, ice, fog, smoke, etc.), and the like. An illustrative collection of cameras mounted on a vehicle to form a vision system will be described with regard to FIG. 1B. As previously described, vehicles 102 will rely on such vision systems for defined vehicle operational functions without assistance from or in place of other traditional detection systems.

In yet another aspect, the local sensors can include one or more positioning systems that can obtain reference information from external sources that allow for various levels of accuracy in determining positioning information for a vehicle. For example, the positioning systems can include various hardware and software components for processing information from GPS sources, Wireless Local Area Networks (WLAN) access point information sources, Bluetooth information sources, radio-frequency identification (RFID) sources, and the like. In some embodiments, the positioning systems can obtain combinations of information from multiple sources. Illustratively, the positioning systems can obtain information from various input sources and determine positioning information for a vehicle, specifically elevation at a current location. In other embodiments, the positioning systems can also determine travel-related operational parameters, such as direction of travel, velocity, acceleration, and the like. The positioning system may be configured as part of a vehicle for multiple purposes including self-driving applications, enhanced driving or user-assisted navigation, and the like. Illustratively, the positioning systems can include processing components and data that facilitate the identification of various vehicle parameters or process information.

In still another aspect, the local sensors can include one or more navigations system for identifying navigation related information. Illustratively, the navigation systems can obtain positioning information from positioning systems and identify characteristics or information about the identified location, such as elevation, road grade, etc. The navigation systems can also identify suggested or intended lane location in a multi-lane road based on directions that are being provided or anticipated for a vehicle user. Similar to the location systems, the navigation system may be configured as part of a vehicle for multiple purposes, including self-driving applications, enhanced driving or user-assisted navigation, and the like. The navigation systems may be combined or integrated with positioning systems. Illustratively, the positioning systems can include processing components and data that facilitate the identification of various vehicle parameters or process information.

The local resources further include one or more processing component(s) that may be hosted on the vehicle or a computing device accessible by a vehicle (e.g., a mobile computing device). The processing component(s) can illustratively access inputs from various local sensors or sensor systems and process the inputted data as described herein. For purposes of the present application, the processing component(s) will be described with regard to one or more functions related to illustrative aspects. For example, processing component(s) in vehicles 102 will collect and transmit the first data set corresponding to the collected vision information.

The environment can further include various additional sensor components or sensing systems operable to provide information regarding various operational parameters for use in accordance with one or more of the operational states. The environment can further include one or more control components for processing outputs, such as the transmission of data through a communications output, generation of data in memory, the transmission of outputs to other processing components, and the like.

Figure 3:
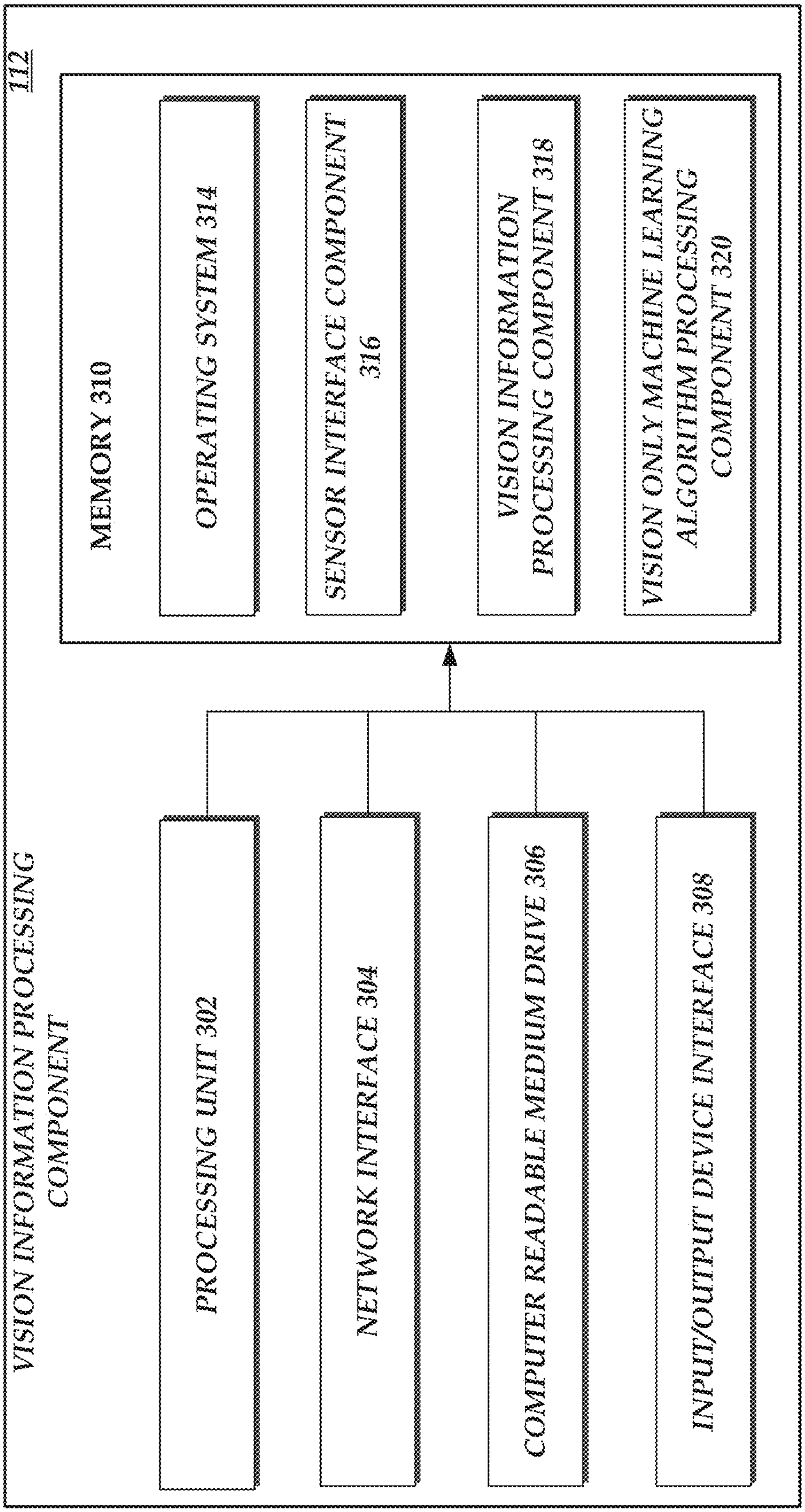
FIG. 3 is an example architecture of vision information processing component.

With reference now to FIG. 3, an illustrative architecture for implementing the vision information processing component 112 on one or more local resources or a network service will be described. The vision information processing component 112 may be part of components/systems that provide functionality associated with the operation of headlight components, suspension components, etc. In other embodiments, the vision information processing component 112 may be a stand-alone application that interacts with other components, such as a local sensors or sensor systems, signal interfaces, etc.

Example Architecture of Vision Information Processing Component

The architecture of FIG. 3 is illustrative in nature and should not be construed as requiring any specific hardware or software configuration for the vision information processing component 112. The general architecture of the vision information processing component 112 depicted in FIG. 3 includes an arrangement of computer hardware and software components that may be used to implement aspects of the present disclosure. As illustrated, the vision information processing component 112 includes a processing unit 302, a network interface 304, a computer readable medium drive 306, and an input/output device interface 3008, all of which may communicate with one another by way of a communication bus. The components of the vision information processing component 112 may be physical hardware components or implemented in a virtualized environment.

The network interface 304 may provide connectivity to one or more networks or computing systems, such as the network of FIG. 1A. The processing unit 302 may thus receive information and instructions from other computing systems or services via a network 106. The processing unit 302 may also communicate to and from memory 310 and further provide output information for an optional display via the input/output device interface 308. In some embodiments, the vision information processing component 112 may include more (or fewer) components than those shown in FIG. 3, such as implemented in a mobile device or vehicle.

The memory 310 may include computer program instructions that the processing unit executes in order to implement one or more embodiments. The memory generally includes RAM, ROM, or other persistent or non-transitory memory. The memory may store an operating system 314 that provides computer program instructions for use by the processing unit in the general administration and operation of the vision information processing component 112. The memory may further include computer program instructions and other information for implementing aspects of the present disclosure. For example, in one embodiment, the memory includes a sensor interface component 316 that obtains information from vehicles 102, such as vehicles 102, data stores, other services, and the like.

The memory 310 further includes a vision information processing component 318 for obtaining and processing the first and second sets of data in accordance with various operational states of the vehicle as described herein. The memory can further include a vision only machine learning algorithm processing component 320 for utilizing a combined data set to generate machine learning algorithms for use in vision-only based vehicles 102. Although illustrated as components combined within the vision information processing component 112, one skilled in the relevant art will understand that one or more of the components in memory may be implemented in individualized computing environments, including both physical and virtualized computing environments.

Example Embodiment of Training Machine Learning Algorithms

Figure 4:
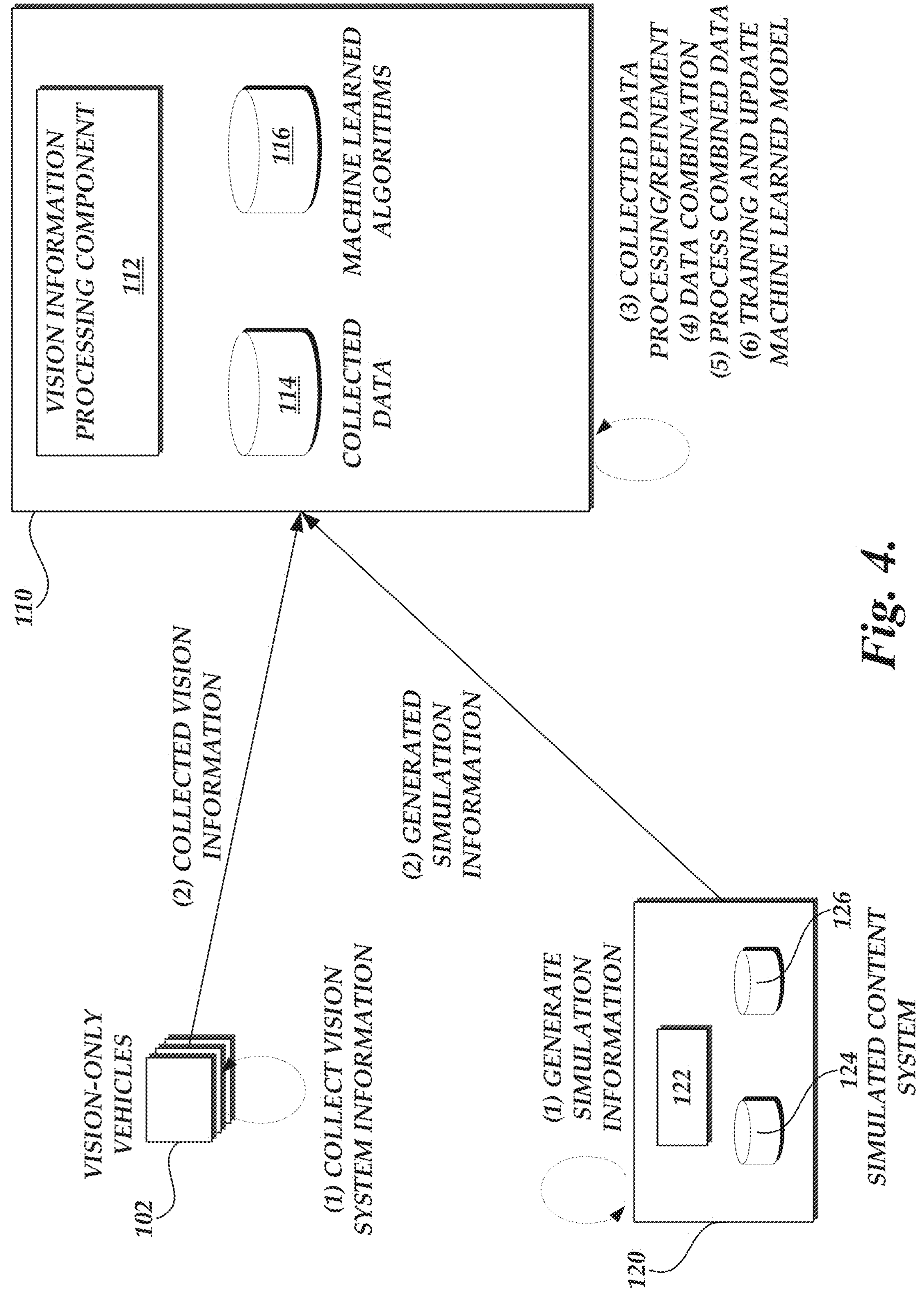
FIG. 4 is a diagram illustrating an example of embodiment for updating machine learning algorithms.

Turning now to FIG. 4, illustrative interactions for the components of the environment to generate and process vision and simulation system data to update training models for machine learning algorithms will be describe. At (1), one or more vehicles 102 can collect and transmit a set of inputs (e.g., the first data set). The first set of data illustratively corresponds to the video image data and any associated metadata or other attributes collected by the vision system of the vehicle 102.

Also at (1), the simulation system generates supplemental video image data and associated attribute data. Illustratively, the simulation system 120 can utilize a set of variables or attributes that can be changed to create different scenarios or scenes for use as supplemental content. For example, the simulation system 120 can utilize color attributes, types of object attributes, acceleration attributes, action attributes, time of data attributes, location/position attributes, weather condition attributes, and density of vehicle attributes to create various scenarios related to an identified object. Illustratively, the supplemental content can be utilized to emulate real-world scenarios that may be less likely to occur or be measured by the set of vehicles 102. For example, the supplemental content can emulate various scenarios that would correspond to unsafe or hazardous conditions.

The simulation system 120 may illustratively utilize a statistical selection of scenarios to avoid repetition based on trivial differences (e.g., similar scenarios varying only by color of object) that would otherwise have a potential to bias a machine learning algorithm. Additionally, the simulation system 120 may further obtain inputs, such as from the network service 110, as to the number of supplemental content frames and distribution of differences in one or more variables.

Illustratively, the output from the simulation system 120 can include embedded information identifying one or more attributes (e.g., position, velocity and acceleration) that can be detected or processed by the network service 110. For example, the simulation system 120 can include label data with the video image frame data for faster processing. In one embodiment, the simulation system 120 produces a combined dataset, and the network service 110 gets the video data and gets trained to predict the label. Illustratively, the simulation system 120 can provide a customized set of details/labels for each simulation to correspond to the inputs required for detailed analysis. In this regard, the simulated content data sets can facilitate detailed labels and can be dynamically adjusted as required for different machine learning training sets.

At (2), the set of vehicles 102 and the simulation system 120 can provide the collected data. The set of vehicles 102 and the simulation system 120 may transmit synchronously or asynchronously based on time or event criteria. Additionally, the set of target vehicles 102 may batch the collected set of data.

At (3), the network service can then process the vision-based data, such as to complete lost frames of video data, update version information, error correction, and the like. At (4), the network service 110 then combines the data based on standardized data. Illustratively, the combined data sets allow the supplementing of the previously collected vision data with additional information or attribute/characteristics that may not have been otherwise available from processing the vision data. The combined set of data can result in a set of data that tracks objects of a defined set of time based on the first and second set of data.

At (5), the network service 110 can then process the combined data set using various techniques. Such techniques can include smoothing, extrapolation of missing information, applying kinetic models, applying confidence values, and the like. At (6), the network service generates an updated machine learning algorithm based on training on the combined data set.

Example of Flow Diagram Embodiments of Training Machine Learning Algorithm

Figure 5:
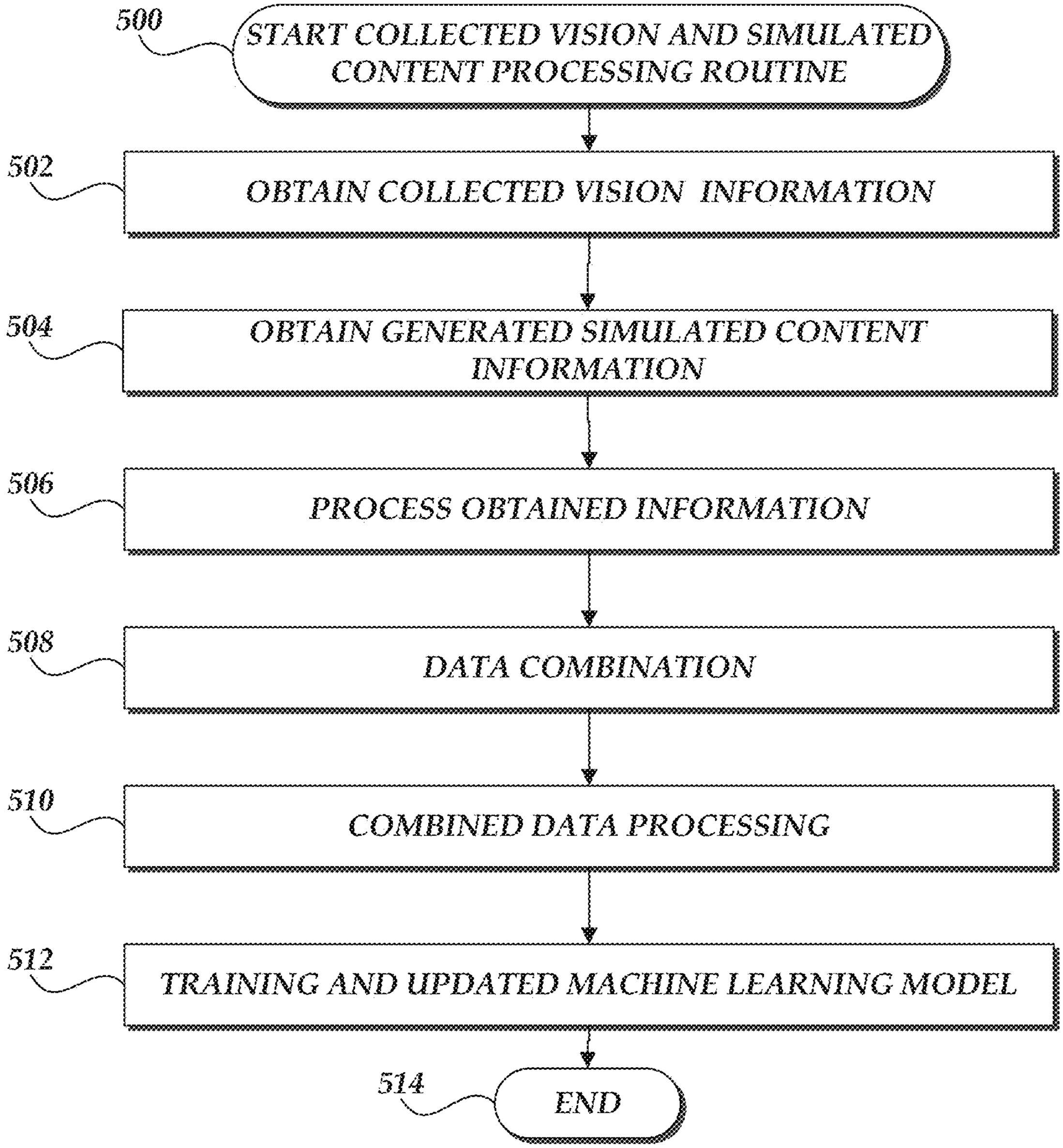
FIG. 5 is a flow diagram illustrating an example of embodiment for updating machine learning algorithms.

Turning now to FIG. 5, a routine 500 for processing collected vision and simulation system data will be described. Routine 500 is illustratively implemented by the network service 110. As described above, routine 500 may be implemented after the target vehicle(s) 102, including vision and simulation systems 120 have collected or generated the first and second sets of data. At block 502, the network service obtains the first set of data. The first set of data illustratively corresponds to the video image data and any associated metadata or other attributes collected by the vision system 200 of the vehicle 102. At block 504, the network service 110 obtains the second set of data. The second set of data includes supplemental video image data and associated attribute data. Illustratively, the simulation system 120 can utilize a set of variables or attributes that can be changed to create different scenarios or scenes for use as supplemental content. For example, the simulation system 120 can utilize color attributes, types of object attributes, acceleration attributes, action attributes, time of data attributes, location/position attributes, weather condition attributes, and density of vehicle attributes to create various scenarios related to an identified object. Illustratively, the supplemental content can be utilized to emulate real-world scenarios that may be less likely to occur or be measured by the set of vehicles 102. For example, the supplemental content can emulate various scenarios that would correspond to unsafe or hazardous conditions.

At block 506, the network service 110 can then process the vision-based data, such as to complete lost frames of video data, update version information, error correction, and the like. At block 508, the network service 110 then combines the data based on standardized data. Illustratively, the combined data sets allow the supplementing of the previously collected vision data with additional information or attribute/characteristics that may not have been otherwise available from processing the vision data. The combined set of data can result in a set of data that tracks objects of a defined set of time based on the first and second sets of data. The first and second sets of data correspond to a common timeframe.

At block 510, the network service 110 can then process the combined data set using various techniques. Such techniques can include smoothing, extrapolation of missing information, applying kinetic models, applying confidence values, and the like. At block 512, the network service generates an updated machine learning algorithm based on training on the combined data set. Illustratively, the network service 110 can utilize a variety of machine learning models to generate updated machine learning algorithms. Routine 500 terminates at block 514.

Example Architecture of Simulation System

Figure 6:
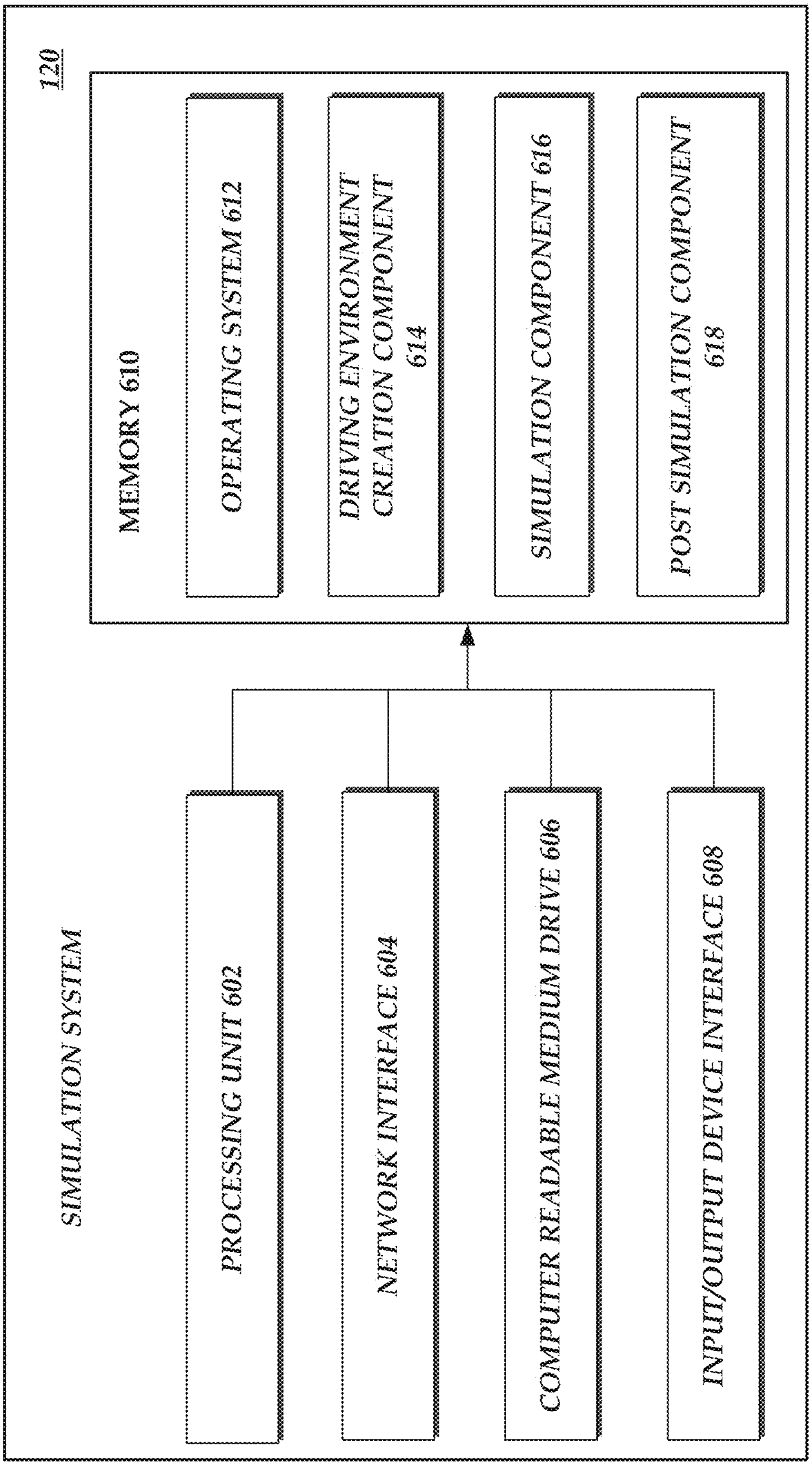
FIG. 6 is an example architecture of simulation system.

With reference now to FIG. 6, an illustrative architecture for implementing the simulation system 120 on the network service 110 will be described. The simulation system 120 may be part of components/systems that can provide functionality associated with processing and storing data received from a fleet of vehicles, creating simulation environments, and simulating functionality related to autonomous or semi-autonomous driving of virtual vehicle (e.g., vehicle used for the simulation), and providing processing results to be used for machine learning algorithms.

The architecture of FIG. 6 is illustrative in nature and should not be construed as requiring any specific hardware or software configuration for the simulation system 120. The general architecture of the simulation system 120 is depicted in FIG. 6, includes an arrangement of computer hardware and software components that may be used to implement aspects of the present disclosure. As illustrated, the simulation system 120 includes a processing unit 602, a network interface 604, a computer readable medium drive 606, and an input/output device interface 608, all of which may communicate with one another by way of a communication bus. The components of the simulation system 120 may be physical hardware components that can include one or more circuitries and software models.

The network interface 604 may provide connectivity to one or more networks or computing systems, such as the network 106 of FIG. 1A. The processing unit 602 may thus receive information and instructions from other computing systems or services via a network. The processing unit 602 may also communicate to and from memory 610 and further provide output information via the input/output device interface. In some embodiments, the simulation system 120 may include more (or fewer) components than those shown in FIG. 6.

The memory 610 may include computer program instructions that the processing unit 602 executes in order to implement one or more embodiments. The memory 610 generally includes RAM, ROM, or other persistent or non-transitory memory. The memory 610 may store an operating system 612 that provides computer program instructions for use by the processing unit 602 in the general administration and operation of the simulation system 120. The memory 610 may further include computer program instructions and other information for implementing aspects of the present disclosure.

The memory 610 may include the driving environment creation component 614. The driving environment creation component 614 can be configured to receive the vehicle data (e.g., vision information) from a fleet of vehicles. In some embodiments, the driving environment creation component 614 can receive various driving environments from the processor system 108. As described in FIG. 1C, the vision-based machine learning model engine 136 (implemented in the processor system 108) processes the image information 132 and generates the driving environments. Then, the driving environment creation component 614 can receive the driving environments and store them in the scenario clip data store 124.

In some embodiments, the environments can be generated based on real-world environment data. For example, a birds-eye view can provide real-world environment data by projecting objects and roads surrounding the vehicle in a vector space. For example, the birds-eye view represents a view of a real-world environment of a vehicle in which a virtual camera is pointing downwards at a particular height. Thus, objects positioned about the vehicle are projected into this birds-eye view vector space effectuating the accurate identification of certain types of objects. In some embodiments, the environment can be generated based on identifying vulnerable road users (VRUs) and non-VRUs. For example, a VRU may include a pedestrian, a baby carriage, a stroller, a skateboarder, and so on. A non-VRU may include a car, a truck, a semi-truck, an emergency vehicle, an ambulance, and so on. Thus, these different branches may focus on, and be experts in, specifics related to vehicles or pedestrians. the machine learning model may project the VRUs into a vector space in which the virtual camera is set at a first height (e.g., 1 meter, 1.5 meters, 2 meters, and so on). In this way, pedestrians may be viewed by the machine learning model at about human height to ensure proper detection and characterization. The machine learning model may, in contrast, project non-VRUs into a vector space in which the vector camera is set a second height (e.g., 13 meters, 15 meters, 20 meters, and so on). In some embodiments, the second height may be greater than 1 meter, 1.5 meters, 2 meters, and so on, and less than 13 meters, 15 meters, 20 meters, 25 meters, 30 meters, and so on. In this way, non-VRUs may be viewed by the machine learning model at a raised height to allow for a reduction in object occlusions while preserving substantial maximum range of detection of objects. In some embodiments, the environment can be generated by utilizing a lane connectivity network. The lane connectivity network identifies points and characterizes the points as forming part of a lane. For example, the lane connectivity network may include a transformer network with one or more autoregressive blocks. As will be described, the lane connectivity network may autoregressively label points with associated characterizations, similar to that of describing the lanes in one or more sentences. For example, the lane connectivity network may describe a lane as including a multitude of points which may extend across an intersection. Additionally, the lane connectivity network may describe multiple lanes as including respective points which extend across an intersection. The lane connectivity network may characterize certain points as being, for example, merge points, forking points, and so on. The lane connectivity network may additionally characterize points as being in a lane that is characterized by an estimated width. The characterization of these points may allow for a spline, or other connection schemes, to be determined for the points in a lane.

The driving environment creation component 614 may also receive ground truth attribute data utilized for the autonomous or semi-autonomous driving system. For example, one or more objects identified by the driving system can be labeled with ground truth attributes. These labeled data are generally used for the machine learning algorithms to identify objects. For example, a vehicle can be labeled with a ground truth, and any detected object having one or more common attributes with the labeled vehicle can be identified as a vehicle. The object of the labeled ground truth is not limited to a specific type of object, and any object can be labeled with the ground truth based on the specific application.

The memory may further include a simulation component 616. The simulation component 616 can be configured to simulate the autonomous or semi-autonomous driving of a virtual vehicle (e.g., vehicle used for the simulation). For example, the simulation component 616 can import a driving environment from the scenario clip data store 124 and simulate driving the vehicle by using the machine learning algorithms.

In some embodiments, the simulation component 616 can modify the driving environment by adding or removing one or more driving conditions. For example, the simulation component 616 can add a specific weather condition to the driving environment. The simulation component 616 can also add or remove one or more objects in the driving environments. The present application does not limit the modification of the driving environment by changing driving conditions.

In some embodiments, the simulation component 616 uses various machine learning models for the simulation. For example, the simulation component 616 may utilize machine learning algorithms that vehicles are using for the autonomous or semi-autonomous driving. In some embodiments, the simulation component 616 can utilize various types of machine learning algorithms, and each simulation result associated with each type of the machine learning algorithm can be stored.

In some embodiments, the simulation component 616 can label the ground truth on the images obtained from the fleet of vehicles and/or the created driving environments. One or more objects in these images can be labeled with ground truth. The labeled ground truth can be utilized to identify the objects. For example, vehicles included in the images can have ground truth label, and the simulation system and the machine learning algorithms can identify the label and recognize the label as a vehicle. In some embodiments, the ground truth label of an object can have sub label. For example, vehicles can have a ground truth label, and each vehicle can have sub label based on its types, such as bus, sedan, SUV, RV, etc.

The memory 610 can further include a post simulation component 618. The post simulation component 618 can be configured to analyze the simulation results. For example, the post simulation component 618 can analyze the driving parameters of the vehicle in each driving environment and determine whether any of the driving parameters is needed to be updated. For example, the driving environment creation component 614 can generate a certain driving environment that requires a vehicle to turn to a specific direction, the environment based on road conditions, other vehicles, traffic signals, pedestrians, etc. Then, the simulation component 616 can simulate turning the vehicle that the vehicle is autonomously driven by the machine learning algorithms. After the simulation, the post-simulation component 618 can analyze the simulation results, for example, the speed and steering angle of the vehicle. Thus, in determining that the speed and/or steer angle needs to be modified to provide an optimized vehicle turns, the post simulation component 618 may update parameters of the machine learning algorithms related to the vehicle speed and steer angle based on the optimized vehicle turn.

In some embodiments, one or more components of the memory 610 can be implemented as a simulation engine. For example, the simulation engine can generate various driving environments and simulate the driving of a virtual vehicle (e.g., vehicle used for the simulation) using the machine learning algorithms.

Figure 7:
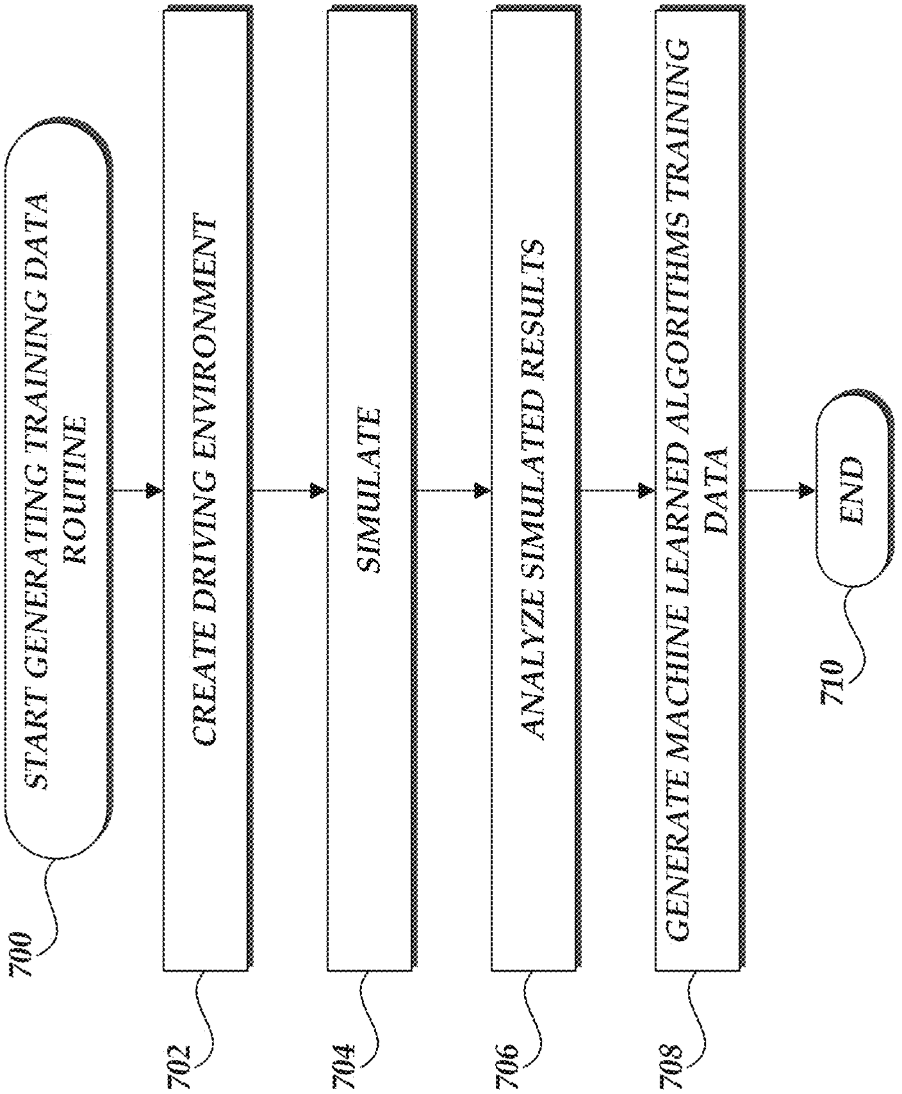
FIG. 7 is a flow diagram illustrating an example of embodiment for training machine learning algorithms.

Example of Flow Diagram of Training Machine Learning Algorithms Using Simulation System With reference now to FIG. 7, a routine 700 for generating training data for machine learning algorithms will be described. Routine 700 is illustratively implemented by the simulation system 120. The processes illustrated in FIG. 7 are illustrative in nature and should not be construed as limiting.

At block 702, the simulation system creates driving environment. The simulation system can be configured to receive the vison-based image data (e.g., vision information) from a fleet of vehicles. In some embodiments, the simulation system can receive various driving environments from the processor system 108. As described in FIG. 1C, the vision-based machine learning model engine 136 (implemented in the processor system 108) processes the image information 132 and generates the driving environments. Then, the simulation system can receive the driving environments and store them in the scenario clip data store 124.

In some embodiments, the simulation system generates the driving environments based on real-world environment data. For example, a birds-eye view can provide real-world environment data by projecting objects and roads surrounding the vehicle in a vector space. For example, the birds-eye view represents a view of a real-world environment of a vehicle in which a virtual camera is pointing downwards at a particular height. Thus, objects positioned about the vehicle are projected into this birds-eye view vector space effectuating the accurate identification of certain types of objects. In some embodiments, the environment can be generated based on identifying vulnerable road users (VRUs) and non-VRUs. For example, a VRU may include a pedestrian, a baby carriage, a stroller, a skateboarder, and so on. A non-VRU may include a car, a truck, a semi-truck, an emergency vehicle, an ambulance, and so on. Thus, these different branches may focus on, and be experts in, specifics related to vehicles or pedestrians. The machine learning model may project the VRUs into a vector space in which the virtual camera is set at a first height (e.g., 1 meter, 1.5 meters, 2 meters, and so on). In this way, pedestrians may be viewed by the machine learning model at about human height to ensure proper detection and characterization. The machine learning model may, in contrast, project non-VRUs into a vector space in which the vector camera is set a second height (e.g., 13 meters, 15 meters, 20 meters, and so on). In some embodiments, the second height may be greater than 1 meter, 1.5 meters, 2 meters, and so on, and less than 13 meters, 15 meters, 20 meters, 25 meters, 30 meters, and so on. In this way, non-VRUs may be viewed by the machine learning model at a raised height to allow for a reduction in object occlusions while preserving substantial maximum range of detection of objects. In some embodiments, the environment can be generated by utilizing a lane connectivity network. The lane connectivity network identifies points and characterizes the points as forming part of a lane. For example, the lane connectivity network may include a transformer network with one or more autoregressive blocks. As will be described, the lane connectivity network may autoregressively label points with associated characterizations, similar to that of describing the lanes in one or more sentences. For example, the lane connectivity network may describe a lane as including a multitude of points which may extend across an intersection. Additionally, the lane connectivity network may describe multiple lanes as including respective points which extend across an intersection. The lane connectivity network may characterize certain points as being, for example, merge points, forking points, and so on. The lane connectivity network may additionally characterize points as being in a lane that is characterized by an estimated width. The characterization of these points may allow for a spline, or other connection schemes, to be determined for the points in a lane.

The simulation system may also receive ground truth attribute data utilized for the autonomous or semi-autonomous driving system. For example, one or more objects identified by the driving system can be labeled with ground truth attributes. These labeled data are generally used for the machine learning algorithms to identify objects. For example, a vehicle can be labeled with a ground truth, and any detected object having one or more common attributes with the labeled vehicle can be identified as a vehicle. The object of the labeled ground truth is not limited to a specific type of object, and any object can be labeled with the ground truth based on the specific application.

At block 704, the simulation system simulates the autonomous or semi-autonomous driving of a virtual vehicle (e.g., vehicle used for the simulation). For example, the simulation system can import a driving environment from the scenario clip data store 124 and simulate driving the vehicle by using the machine learning algorithms or by using driving parameters generated by the machine learning algorithms.

In some embodiments, the simulation system can modify the driving environment by adding or removing one or more driving conditions. For example, the simulation system can add a specific weather condition to the driving environment. The simulation system can also add or remove one or more objects in the driving environment. The present application does not limit the modification of the driving environment by changing driving conditions.

In some embodiments, the simulation system uses various machine learning models for the simulation. For example, the simulation system may utilize machine learning algorithms that vehicles are using for the autonomous or semi-autonomous driving. In some embodiments, the simulation system can utilize various types of machine learning algorithms and each simulation result associated with each type of the machine learning algorithm can be stored.

In some embodiments, the simulation system can label the ground truth on the images obtained from the fleet of vehicles and/or the created driving environments. One or more objects in these images can be labeled with ground truth. The labeled ground truth can be utilized to identify the objects. For example, vehicles included in the images can have ground truth label, and the simulation system and the machine learning algorithms can identify the label and recognize the label as a vehicle. In some embodiments, the ground truth label of an object can have sub label. For example, vehicles can have a ground truth label, and each vehicle can have sub label based on its types, such as bus, sedan, SUV, RV, etc.

At block 706, the simulation system analyzes the simulated results generated at block 704. The simulation system may analyze the simulation results, such that the simulation system analyzes the driving parameters of the vehicle in each driving environment and determine whether any of the driving parameters is needed to be updated. For example, the driving environment can include a certain driving environment that requires a vehicle to turn to a specific direction, the environment based on road conditions, other vehicles, traffic signals, pedestrians, etc. Then, the simulation system can simulate turning the vehicle that the vehicle is autonomously driven by the machine learning algorithms. After the simulation, the simulation system can analyze the simulation results, for example, the speed and steering angle of the vehicle.

At block 708, the simulation system generates machine learning algorithms training data. For example, the simulation system may determine an optimized driving parameters based on each driving environment, and these driving parameters are used as the machine learning algorithms training data. For example, the simulation system, upon determining that a specific set of driving parameters for the speed and/or steer angle needs to be used to provide optimized vehicle turns, the simulation system may provide these driving parameters to train the machine learning algorithms. In some embodiments, the simulation system may have optimized vehicle driving parameters for each driving environment. For example, when a vehicle is turning to a specific direction, the vehicle may have the optimized driving parameter to provide an optimal turning trajectory, such as optimal velocity, rolling, wheel spin, etc. Thus, the simulation system may generate the training data based on the optimized driving parameters.

In some embodiments, the simulation system uses generative machine learning techniques to generate an environment. For example, the simulation system may leverage the above-described lane connectivity network to generate random lane connections (e.g., input may be used to cause an output of lane connectivity). In this example, the simulation system may then simulate disparate objects moving about the random lane connections. As an example, a pedestrian may be positioned as cross one lane while one or more other lanes have different types of vehicles performing different actions. As described herein, ground truth labels may be generated automatically for this environment. Advantageously, the ground truth labels may be in conformance with the particular bespoke models being used.

For example, and with respect to the above, ground truth labels associated with the random lane connections may be generated. These ground truth labels may be the same as those used to train the lane connectivity network. As another example, certain fixed or static objects may have ground truth labels the same as the birds eye view network described above. As another example, objects which are dynamically moving (e.g., pedestrians, vehicles) may have ground truth labels consistent with the periscope view described above.

Output of the simulation system may thus be used along with the ground truth labels. For example, images (e.g., renders from the simulation system), video clips, and so on, may be obtained of the simulated environment and used as input to the above-described machine learning models for training. Parameters of the machine learning models may be updated based on the ground truth labels.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed decision and control algorithms. It is to be understood that the forms of disclosure herein shown and described are to be taken as representative embodiments. Equivalent elements, materials, processes, or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer those two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed:

1. A system comprising one or more processors and non-transitory computer storage medium storing instructions that when executed by the one or more processors, cause the processors to generate a set of machine learning algorithms training data, wherein the system is included in a simulation system, and wherein the generation of the training data comprises:

creating driving environments based at least on vision-based image data received from one or more two-dimensional cameras of a vehicle;

simulating driving a virtual vehicle by importing only vision-based image data associated with driving environment scenarios, wherein the driving environment scenario is based at least on the created driving environment, wherein, during the simulation, the system:

monitors performance of the virtual vehicle, and dynamically updates at least one parameter of at least one vision-based machine learning model based on the performance, and wherein the system uses an updated at least one vision-based machine learning model for subsequent simulations;

in response to completing the simulation, analyzing simulated results;

determining optimized driving parameters associated with the driving environment scenario; and generating the set of machine learning algorithms training data based on the determined optimized driving parameters.

2. The system of claim 1, wherein the created driving environment includes bird eye views.

3. The system of claim 1, wherein the created driving environment includes identified vulnerable road users (VRUs) and non-VRUs.

4. The system of claim 1, wherein the driving environment is created by using a lane connectivity network.

5. The system of claim 1, wherein the vision-based image data is generated by the vision-based machine learning model engine implemented in the vehicle that inputs data from the one or more two-dimensional cameras of the vehicle.

6. The system of claim 5, wherein the generation of the training data further comprises receiving ground truth attribute data from the vehicle.

7. The system of claim 1, wherein the driving environment scenarios include one or more driving conditions in addition to the created driving environment.

8. The system of claim 1, wherein various types of machine learning algorithms are used for the simulation.

9. The system of claim 1, wherein the simulation system includes scenario clip data store.

10. The system of claim 1, wherein the simulation system is a simulation engine.

11. The system of claim 1, wherein the virtual vehicle uses same machine learning algorithms used for the vehicle.

12. The system of claim 1, wherein the simulation includes objects with labeled ground truth.

13. The system of claim 12, in response to determining that the labeled objects are different from labeled objects included in the vision-based image data, updating the labeled objects included in the simulation.

14. Non-transitory computer storage medium storing instructions that when executed by a system of one or more processors which are included in an autonomous or semi-autonomous vehicle, cause the system to perform operations comprising:

creating driving environments based at least on vision-based image data received from one or more two-dimensional cameras of a vehicle;

simulating driving a virtual vehicle by importing only vision-based image data associated with driving environment scenario, wherein the driving environment scenario is based at least on the created driving environment, wherein, during the simulation, the system:

monitors performance of the virtual vehicle, and dynamically updates at least one parameter of at least one vision-based machine learning model based on the performance, and wherein the system uses an updated at least one vision-based machine learning model for subsequent simulations;

in response to completing the simulation, analyzing simulated results;

determining optimized driving parameters associated with the driving environment scenario; and generating a set of machine learning algorithms training data based on the determined optimized driving parameters.

* * * * *